US006984445B1

(12) United States Patent
Yamagata et al.

(10) Patent No.: US 6,984,445 B1
(45) Date of Patent: Jan. 10, 2006

(54) MULTI-LAYER SHEET, A MANUFACTURING METHOD OF THE MULTI-LAYER SHEET AND A MOLDING METHOD OF THE MULTI-LAYER SHEET

(75) Inventors: Kazuo Yamagata, Aichi (JP); Isao Higuchi, Osaka (JP); Takamasa Fukuoka, Kyoto (JP); Michitaka Tsujimoto, Kyoto (JP); Masashi Okabe, Kyoto (JP); Yoshihiro Inui, Kyoto (JP)

(73) Assignee: Sekisui Kagaku Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 10/204,915

(22) PCT Filed: Feb. 28, 2000

(86) PCT No.: PCT/JP00/01152

§ 371 (c)(1),
(2), (4) Date: Aug. 27, 2002

(87) PCT Pub. No.: WO01/64431

PCT Pub. Date: Sep. 7, 2001

(51) Int. Cl.
*B32B 5/14* (2006.01)
*B32B 31/14* (2006.01)

(52) U.S. Cl. .................. 428/309.9; 428/306.6; 428/308.4; 428/319.3; 428/319.7; 428/319.9; 442/327; 442/370; 156/79; 264/46.4; 264/46.5

(58) Field of Classification Search ............. 428/319.3, 428/319.7, 319.9, 309.9, 306.6, 308.4; 442/327, 442/370; 156/79; 264/46.4, 46.5
See application file for complete search history.

(56) References Cited

U.S. PATENT DOCUMENTS 5,055,341 A * 10/1991 Yamaji et al. ............... 428/174
5,482,667 A * 1/1996 Dunton et al. ............... 264/136
6,613,172 B1 * 9/2003 Tsujimoto et al. ............ 156/78

FOREIGN PATENT DOCUMENTS

WO    WO 9921693 A1 *  5/1999

* cited by examiner

*Primary Examiner*—Hai Vo
(74) *Attorney, Agent, or Firm*—Kubovcik & Kubovcik

(57) ABSTRACT

A multi-layer sheet of the present invention comprises a thermoplastic resin foam sheet, a reinforcing sheet layered on integrated with at least one side of the thermoplastic resin foam sheet; the reinforcing sheet being formed by a non-woven fabric which comprises non-meltable fibers which are interwound with one another and which are bound together with a thermoplastic resin, the thermoplastic resin foam sheet having an aspect ratio Dz/Dxy of bubbles of 1.2 or more, and an expansion ratio of 5~50 cc/g, and therefore the sheet is excellent in bending strength, compressive strength, thermo-forming property and dimensional stability as well as lightweight property, and so can ideally be used for an upholstery material for vehicles, a heat-insulation material, a buffer material and the like.

12 Claims, 4 Drawing Sheets

MULTI-LAYER SHEET, A MANUFACTURING METHOD OF THE MULTI-LAYER SHEET AND A MOLDING METHOD OF THE MULTI-LAYER SHEET

FIELD OF THE INVENTION

The present invention relates to a multi-layer sheet, which is excellent in lightweight property, bending strength, compressive strength, thermoforming property and dimensional stability, to a manufacturing method of the multi-layer sheet and to a molding method thereof.

BACKGROUND OF THE INVENTION

Conventionally, foam made of thermoplastic resin is used as an insulation material, a buffer material, and a floating material, since the foam is excellent in lightweight property, insulation property and flexibility. Among those, polyolefin-based resin foam, in particular, is widely used for such upholstery materials as doors, ceilings, instrument panels etc. of vehicles by secondary thermoforming, as the polyolefin-based resin foam is excellent in heat-resisting property, dimensional stability, and so on.

Further, in the Japanese Patent Laid Open No. 8-11254, composite foam suitable for upholstery materials for vehicles is suggested in which thermoplastic resin foam containing polyolefin-based resin foam is used.

However, in the above-mentioned composite foam, when an expansion ratio of the thermoplastic resin foam is raised in order to improve the lightweight property, bending strength and compression rigidity of the composite foam is lowered. Consequently, when the composite foam was used as a ceiling material of a vehicle, there was a problem that the composite foam was bended, flexed or broken at the time of manufacturing or installation in a vehicle, which resulted in a dent at a part to be fixed to the vehicle which further resulted in unstable installation.

Further, accessories of the vehicle such as a lamp were conventionally mounted to an upholstery material after the upholstery material was installed in the vehicle. However, a module system in assembling vehicles has advanced these years, in which the accessories such as the lamp are mounted to the upholstery material of the vehicle in advance, and the upholstery material provided with the accessories is installed in the vehicle. Accordingly, better bending strength and better compression rigidity are required than before for a use for the upholstery material.

In view of the above-mentioned problems, a purpose of the present invention is to provide a multi-layer sheet, which is excellent in bending strength, compressive strength, a thermoforming property and dimensional stability as well as a lightweight property, and to provide a manufacturing method of the multi-layer sheet and a molding method thereof.

DISCLOSURE OF THE PRESENT INVENTION

The multi-layer sheet according to the present invention comprises a thermoplastic resin foam sheet and a reinforcing sheet layered on and integrated with at least one side of the thermoplastic resin foam sheet, in which the reinforcing sheet comprises non-woven fabric where non-meltable fibers are interwound with one another and are bound together with a thermoplastic resin, and in which bubbles of the thermoplastic resin foam sheet have an aspect ratio Dz/Dxy of 1.2 or more, and an expansion ratio of 5~50 cc/g, and furthermore, by layering and integrating a surface layer on and with the surface of the reinforcing sheet, an uneven surface attributed to the non-meltable fibers of the above-mentioned reinforcing sheet is covered and concealed to form a smooth surface.

The thermoplastic resin used for the above-mentioned thermoplastic resin foam sheet is not limited as long as the thermoplastic resin is the one, which has been conventionally and usually used to provide foam. For example, polyolefin-based resins such as polyethylenes like low density polyethylene, straight-chain low density polyethylene, medium density polyethylene, high density polyethylene and so on, polypropylenes like isotactic polypropylene, syndiotactic polypropylene and so on, polybutene, ethylene-α-olefin copolymer and so on; ethylene-propylene-diene terpolymer; ethylene-vinyl acetate copolymer; ethylene-acrylic ester copolymer; polystyrene-based resins such as polystyrene, polystyrene-based thermoplastic resin elastomer and so on may be enumerated. Among those, polyolefin-based resins are preferable, polyethylene and polypropylene are more preferable, and a mixture of polyethylene and polypropylene is particularly preferable in terms of superiority in lightweight property, chemical resistance, flexibility and elasticity of the obtained multi-layer sheet. In the meantime, the above-mentioned thermoplastic resins may be used independently or jointly. In case polyolefin-based resin and the other thermoplastic resins are used jointly, it is preferable to regulate the polyolefin-based resins to be 70 weight % or more of a total amount of resins. This is because when thermoplastic resins are foamed by using pyrolysis-type foaming agent in a manner as described hereinafter, it is necessary to provide fluidity by melting the thermoplastic resins, however, as a melting point of the thermoplastic resins except polyolefin-based resins is generally higher than that of the polyolefin-based resins, if a content of the polyolefin-based resins is small, the melting point of the whole thermoplastic resin becomes high, and at a time of foaming, the fluidity of the whole thermoplastic resin becomes low, consequence of which is that foaming performance may be spoiled.

As the above-mentioned α-olefin, propylene, 1-butene, 1-pentene, 1-hexene, 4-methyl-1-pentene, 1-heptene, 1-octene, and so on are enumerated, and as copolymers containing an ethylene component, any one of a block copolymer, a random copolymer and a random block copolymer may be used.

Further, polyolefin-based resins added with a polystyrene-based resins are preferable to obtain the multi-layer sheet, which is superior in lightweight property, chemical resistance, flexibility, high elasticity and mechanical strength. In that case, if the content of the polystyrene-based resins is large, such superior properties of the polyolefin-based resins as lightweight property, chemical resistance, flexibility and high elasticity are not demonstrated. Therefore, preferable content of the polystyrene-based resins is 30 weight % or less of the total amount of the polyolefin-based resins and the polystyrene-based resins.

Furthermore, as the above-mentioned thermoplastic resin is required to have elongation stress to a predetermined extent at the time of foaming, a crosslinking structure is provided in methods as described below, for example.

A first method of crosslinking, in order to obtain the thermoplastic resin foam sheet, which is superior in lightweight and recycling properties provided with a required range of fluidity and elongation stress at the time of foaming, is as follows. Namely, the above-mentioned thermoplastic resin and a multifunctional monomer, which has two multifunctional groups or more being able to carry out a radical reaction, is supplied to a generally-used melting and kneading extruder after organic peroxide is added according to necessity. Then, while a melt viscosity of the thermoplastic resin is being adjusted so that the above-mentioned thermoplastic resin can be smoothly melted and kneaded, the above-mentioned thermoplastic resin is allowed to be reacted with the multifunctional monomer in the melting and kneading extruder to provide a modified thermoplastic resin. In other words, the thermoplastic resin is allowed to be reacted with the multifunctional monomer, and a part of the crosslinking structure, which is intended to be finally given to the thermoplastic resin, is introduced to the thermoplastic resin. Then the modified thermoplastic resin is formed to be a required form such as a form of a sheet and so on. After that, the crosslinking structure is further given to the thermoplastic resin by heating the modified thermoplastic resin to a temperature higher than a reaction temperature of the multifunctional monomer in order to provide elongation stress, which is suitable for foaming.

Modification of the thermoplastic resin by having the multifunctional monomer reacted with the above-mentioned thermoplastic resin can be carried out in a manner that the organic peroxide is added to the thermoplastic resin and the multifunctional monomer, according to necessity requires, which is then supplied to the generally-used melting and kneading extruder in order to be melted and kneaded. In the meantime, when a divinyl compound or a diallyl compound is used in particular as the above-mentioned multifunctional monomer, addition of the organic peroxide is preferable.

As the multifunctional monomer, a dioxime compound, a bismaleimide compound, a divinyl compound, an allylic multifunctional compound, a (metha) acrylic multifunctional compound, a quinone compound, and so on are enumerated.

The above-mentioned dioxime compound means a compound which has two oxime groups indicated by a chemical formula (I) or two substituted oxime groups indicated by a chemical formula (II) in which a hydrogen atom in the oxime group is substituted with another atomic group R (mainly hydrocarbon group), or a compound which has both of the aforementioned one oxime group and the one substituted oxime group. To be specific, p-quinone dioxime indicated by a chemical formula (III), p,p'-dibenzoyl quinone dioxime indicated by a chemical formula (VI) and so on are enumerated. In the meantime, the dioxime compounds may be used independently or jointly.

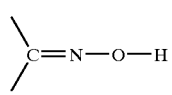

(I)

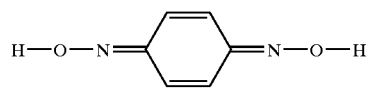

(II)

(III)

-continued

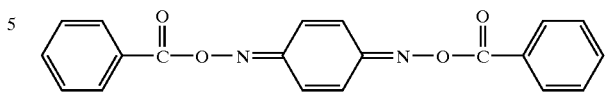

(IV)

The above-mentioned bismaleimide compound means a compound which has two or more structures of maleic acid imide (maleimide) indicated by a chemical formula (V) in a molecule thereof. For example, N, N'-p-phenylene bismaleimide indicated by a chemical formula (VI), N, N'-m-phenylene bismaleimide indicated by a chemical formula (VII) diphenylmethane bismaleimide indicated by a chemical formula (MIII) and so forth are enumerated. In addition, polymaleimide, which has two or more maleimide structures as indicated by a chemical formula (IX) in a molecule thereof, is also included in the bismaleimide compound.

(V)

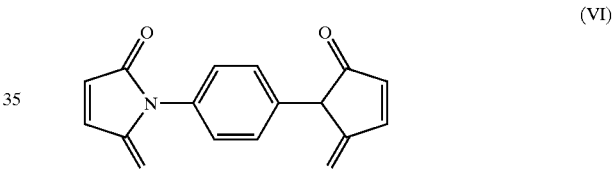

(VI)

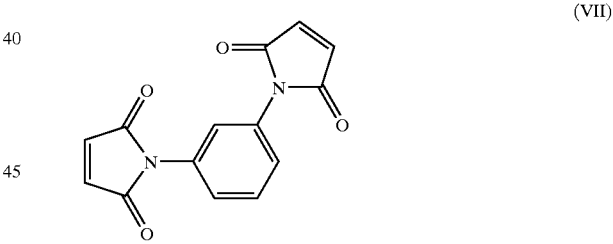

(VII)

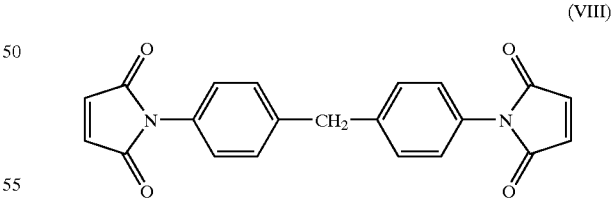

(VIII)

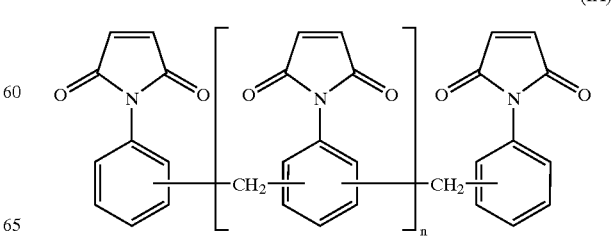

(IX)

As the above-mentioned divinyl compound, o-divinylbenzene, m-divinylbenzene and p-divinylbenzene as indicated by a chemical formula (X) and so forth are enumerated.

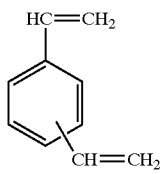

(X)

The above-mentioned allylic multifunctional compound means a compound which has two or more allyl groups ($CH_2=CH-CH_2-$) in the molecule thereof. For example, diallyl phthalate as indicated by a chemical formula (XI), triallyl cyanulate as indicated by a chemical formula (XII), triallyl isocyanulate as indicated by a chemical formula (XII), diallyl chlorendate as indicated by a chemical formula (XIV) and so forth are enumerated.

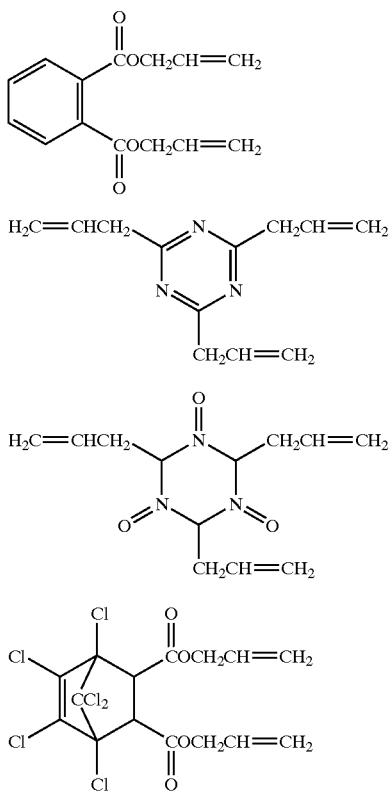

As the above-mentioned (metha) acrylic multifunctional compounds, such di(metha)acrylic compounds as alkandiol di(metha) acrylate, ethylene glycol di(metha) acrylate, propylene glycol di(metha)acrylate, polyethylene glycol di(metha) acrylate, polypropylene grycol di(metha) acrylate, neopentyl glycol di(metha) acrylate, dimethylol tricyclodecane di(metha)acrylate, ethylene glycol adduct di(metha) acrylate of bisphenol A, propylene glycol adduct di(metha) acrylate of bisphenol A and so on, such tri(metha)acrylic compounds as trimethylol propane tri(metha) acrylate, pentaerythritol tri(metha) acrylate, trimethylolpropane ethylene oxide adduct tri(metha) acrylate, glycerol propylene oxide adduct tri(metha)acrylate, tri(metha) acryloyl oxy ethylphosphate and so on, such tetra(metha) acrylates as pentaerythritol tetra(metha) acrylate, ditrimethylol propane tetra (metha) acrylate and so on are enumerated.

As the above-mentioned quinone compound, hydroquinone, p-benzoquinone, tetrachloro-p-benzoquinone and so on are enumerated.

If an amount of addition of the above-mentioned multifunctional monomers is large, crosslinking density of the thermoplastic resin becomes too high and recycling property may become low, or the extruder may be highly loaded or melt fracture may occur when an expandable sheet to provide the multi-layer sheet is extruded from the extruder. If the amount of addition is small, elongation stress required at a time of foaming may not be provided with the thermoplastic resin. Therefore, the amount of addition of the multifunctional monomers should preferably be 0.05~5 weight parts, or more preferably be 0.2~2 weight parts to 100 weight parts of the thermoplastic resin.

If a resin temperature at a time of melting and kneading of the thermoplastic resin and the multifunctional monomer is high, the thermoplastic resin may be decomposed. If the temperature is low, modification of the thermoplastic resin is carried out insufficiently, the elongation stress of the expandable sheet at a time of foaming becomes insufficient, and a thermoplastic resin foam sheet with a required expansion ratio may not be able to be obtained. Therefore, the temperature should preferably be 170° C. or higher and be a decomposition temperature of the thermoplastic resin or lower, and more preferably be 200~250° C.

Further, in order to raise the fluidity of the thermoplastic resin at the time of foaming, which is modified by the multifunctional monomer in a manner as above-mentioned and lower the foaming pressure required for foaming, and in order to more surely obtain the thermoplastic resin foam sheet with spindle-shaped bubbles having the aspect ratio within a required range, which will be described hereinafter, it is preferable that the modified thermoplastic resin which is further added with the unmodified thermoplastic resin is melted and kneaded. In the meantime, the above-mentioned modified thermoplastic resin and the unmodified thermoplastic resin may be of the same kind or of the different kind as far as these two resins are compatible with each other.

The above-mentioned organic peroxide is not particularly limited as far as it is possible to have the multifunctional monomer reacted with the thermoplastic resin. For example, benzoyl peroxide, 2,4-dichlorobenzoyl peroxide, t-butyl peroxy acetate, t-butyl peroxy benzoate, dicumyl peroxide, 2,5-dimethyl-2,5-di(t-butyl peroxy)hexane, di-t-butyl peroxide, 2,5-dimethyl-2,5-di(t-butyl peroxy)-3-hexyne etc., are enumerated. Among these, dicumyl peroxide, 2,5-dimethyl-2,5-di(t-butyl peroxy) hexane, 2,5-dimethyl-2,5-di(t-butyl peroxy)-3-hexyne are preferable. The above-mentioned organic peroxides may be used independently or jointly.

If an amount of addition of the above-mentioned organic peroxide is large, and in case polypropylene is used as the thermoplastic resin, what is called β cleavage occurs remarkably, molecular weight of the obtained modified thermoplastic resin becomes too small and bad foaming, attributed to weakened properties of the thermoplastic resin and to lowered fluidity, may occur. If the amount is small, modification of the thermoplastic resin by the multifunctional monomer may become insufficient. Therefore, the amount should preferably be 0.001~0.5 weight parts or should more preferably be 0.005~0.15 weight parts to 100 weight parts of the thermoplastic resin.

A second method to provide the thermoplastic resin with the crosslinking structure is that a predetermined amount of ionizable radiation is applied to the thermoplastic resin after a predetermined amount of crosslinking agent is added to the thermoplastic resin.

The above-mentioned crosslinking agent is not particularly limited as far as the crosslinking agent is what is generally used for crosslinking of thermoplastic resins. For example, o-divinylbenzene, m-divinylbenzene, p-divinylbenzene, trimythylolpropane trimethacrylate, 1,9-nonanediol dimethacrylate, 1,10-decanediol dimethacrylate, trimelliticacidtriallyl ester, triallylisocyanurate, etc. are enumerated. The crosslinking agents may be used independently or jointly.

If an amount of addition of the crosslinking agent is large, the crosslinking density of the thermoplastic resin becomes too high and expandability may lower. If the amount is small, the crosslinking density of the thermoplastic resin becomes too low and homogeneous foam may not be obtained. Therefore, the amount should preferably be 0.1~10 weight parts or should more preferably be 0.3~5 weight parts to 100 weight parts of the thermoplastic resin.

Degree of crosslinking by the above-mentioned ionizable radiation is regulated by using gel fraction as a criterion. If the gel fraction is large, moldability of the multi-layer sheet may be lowered, and if the gel fraction is small, bending strength of the multi-layer sheet may be lowered. Therefore, the gel fraction should preferably be regulated to be 15~70 weight % and more preferably be 18~65 weight %, and the amount of ionizable radiation is usually regulated to be 1~20 Mrad. The ionizable radiation is not particularly limited as far as the ionizable radiation is what has been conventionally used, and $\alpha$-rays, $\beta$-rays, $\gamma$-rays and electron rays are enumerated, for example.

In the meantime, gel fraction according to the present invention means what is determined in the following manner. Namely, at first, a predetermined amount of thermoplastic resin foam sheet is weighed and taken, and is immersed in 25 ml of xylene of 120° C. for 24 hours and is filtered with 200-mesh stainless wire gauze, and then indissoluble substance is vacuum-dried. Next, the vacuum-dried indissoluble substance is weighed and the gel fraction is calculated according to the following formula. [gel fraction (%)]=(weight of vacuum-dried indissoluble substance/weight of thermoplastic resin foam sheet which is weighed and taken)×100.

The thermoplastic resin is provided with an appropriate crosslinking structure and with fluidity and elongation stress within a required range in the above-mentioned manner, and the obtained multi-layer sheet becomes superior in moldability and surface finishing.

Further, inorganic filler may be added to the above-mentioned foam sheet in order to improve bending strength and compression rigidity of the multi-layer sheet. As the inorganic filler, for example, metal oxides like titanium-dioxide and so on; powdered inorganic fillers like calcium carbonate, talc, kaolin clay, mica and so on; inorganic fillers in a state of balloon, Shirasu-balloon, glass balloon, fly ash balloon and so on. In view of a large effect of improvement in rigidity of the thermoplastic resin and the high dimensional stability of the obtained multi-layer sheet, talc or mica is preferable.

If size of the inorganic filler is large, the bubbles are broken at the time of expansion of the expandable sheet and the foam sheet with a high expansion ratio may not be obtained. Therefore, the size of the particles should preferably be 20 $\mu$m or less, and more preferably be 5 $\mu$m or less. If the aspect ratio of the inorganic filler is large, a bending elasticity slope of the obtained thermoplastic resin foam sheet is raised. Therefore, preferable aspect ratio should be 5 or more.

If an amount of addition of the inorganic filler is large, lightweight property of the obtained multi-layer sheet lowers, and if the amount is small, bending rigidity and compression rigidity lower. Therefore, the amount is limited to 1~100 weight parts to 100 weight parts of the thermoplastic resin, and should preferably be 5~30 weight parts.

Further, oxidation inhibitors such as 2,6-di-t-butyl-p-cresol and so on, or metal deactivators such as methylbenzotriazol and so on may be added to the above-mentioned thermoplastic resin foam sheet.

Most of the bubbles of the above-mentioned thermoplastic resin foam sheet are formed to be spindle-shaped (rugby-ball-shaped), a longitudinal direction of which is directed to a direction of a thickness of the thermoplastic resin foam sheet. By arranging the most of the bubbles of the thermoplastic resin foam sheet so as to direct the longitudinal direction of the bubbles to the direction of the thickness of the thermoplastic resin foam sheet as aforementioned, the thermoplastic resin foam sheet becomes excellent in compression rigidity in the direction of the thickness thereof, and the adjacent bubbles in the thermoplastic resin foam sheet do not interfere with each other at a time of deformation in the direction of the thickness of the thermoplastic resin foam sheet. Consequently, the bubbles can be transformed in a state that the bubbles are smoothly and surely swerved in the direction of the thickness of the thermoplastic resin foam sheet by molding stress applied to the thermoplastic resin foam sheet in a direction of the thickness thereof. Accordingly, the thermoplastic resin foam sheet can be accurately formed to be a required form without fail by the molding stress which is applied in the direction of the thickness thereof.

If the aspect ratio $Dz/Dxy$ of the bubbles of the thermoplastic resin foam sheet is small, the compressive rigidity in the direction of thickness of the obtained thermoplastic resin foam sheet lowers, wherefore the aspect ratio should be limited to 1.2 or more, should preferably be 1.5 or more, and particularly preferably be 2 or more.

The aspect ratio $Dz/Dxy$ of bubbles of the thermoplastic resin foam sheet means a value determined in a manner as described below. Namely, at first, the thermoplastic resin foam sheet is cut in a direction of the thickness. Next, as shown in FIG. 1, a length Dz in the direction of the thickness of the bubble exposed on the cut surface is determined, and a length Dxy, which is a length perpendicular to the direction of the thickness and is along the cut surface, is determined. Then the aspect ratio ($Dz/Dxy$) of each bubble is calculated. And then a mean value of the obtained aspect ratio ($Dz/Dxy$) of each of the bubbles is calculated to determine the aspect ratio ($Dz/Dxy$) of bubbles of the thermoplastic resin foam sheet. In the meantime, object bubbles of the determination in the above-mentioned determination are only what are completely independent without being united with the adjacent bubbles on the cut surface. For example, the adjacent bubbles which are united and integrated into one, and the bubbles whose ends reach the surface of the thermoplastic resin foam sheet are excluded from the object bubbles of the determination.

If the expansion ratio of the thermoplastic resin foam sheet is high, mechanical strengths of the obtained multi-layer sheet such as compression rigidity, bending strength and so on lower, and if the expansion ratio is low, the lightweight property of the obtained multi-layer sheet lowers. Therefore, the expansion ratio is limited to 5~50 cc/g, and should preferably be 10~30 cc/g. In the meantime, the expansion ratio of the above-mentioned thermoplastic resin foam sheet is what was determined according to the Japanese Industrial Standard K6767, and is a reciprocal of an apparent density.

If the compressive strength of the thermoplastic resin foam sheet is small, maximum bending strength of the thermoplastic resin foam sheet also lowers. Consequently, workers may bend and rupture the multi-layer sheet by mistake when the multi-layer sheet is handled or is used as an upholstery material of a vehicle. Further, when multi-layer sheets are piled up on one another, the multi-layer sheets may be flattened or deformed, or when the multi-layer sheet is installed in a car with screws as a ceiling material, the multi-layer sheet may dent around the screws, which may spoil installation stability. Therefore, the compressive strength of the thermoplastic resin foam sheet should preferably be $9.8N/cm^2$ or more, more preferably be $14.7N/cm^2$ or more, and even more preferably be $29.4N/cm^2$ or more.

The compressive strength ($\sigma$) referred to in the present specification means a value indicating resistance against compressive force which is applied in a direction of the thickness, and is found as follows.

At first, the thermoplastic resin foam sheets of 50 mm long and 50 mm wide each are layered on one another in order to make a laminate with a thickness of about 25 mm. The thickness is then accurately determined to be an initial thickness. Next, the laminate is compressed by 25% of the initial thickness of the laminate (in other words, the laminate is compressed so that the thickness thereof becomes 75% of the initial thickness) at a compressive temperature of 10 mm/minute under conditions of a temperature of 20° C. and a humidity of 65% RH. Then, the value of load W(N) is determined, and the W is divided by a compressive area A ($cm^2$).

Compressive Strength $(\sigma)=W(N)/A(cm^2)$

Further, the multi-layer sheet according to the present invention comprises a reinforcing sheet layered on and integrated with one side of the thermoplastic resin foam sheet, or preferably comprises the reinforcing sheets layered on and integrated with both sides of the thermoplastic resin foam sheet. In the meantime, in case the reinforcing sheets are layered on and integrated with the both sides of the thermoplastic resin foam sheet, the reinforcing sheets to be layered on and integrated with the both sides of the thermoplastic resin foam sheet may be of different kind from each other, however, it is preferable to use the same kind of reinforcing sheets which is to be layered on and integrated with the both sides of the thermoplastic resin foam sheet in view of dimensional stability of the obtained multi-layer sheet.

The above-mentioned non-meltable fiber means the fiber which do not melt with heat applied in the manufacturing method of the multi-layer sheet or at a time of molding of the multi-layer sheet to provide a required form. In other words, the non-meltable fiber means the fiber which maintains form and state thereof irrespective of the heat applied in the manufacturing method of the multi-layer sheet or at the time of molding of the multi-layer sheet to provide the required form. As the non-meltable fibers, for example, natural fibers such as cotton, kapok, flax, hemp, kenaf, Manila hemp, sisal hemp, New Zealand hemp, maguey, coir and so on; glass fiber; carbon fiber and so on are enumerated.

If a content of the above-mentioned non-meltable fiber in the reinforcing sheet is high, a content of the thermoplastic resin in the reinforcing sheet becomes comparatively low, wherefore the reinforcing sheet can not be formed to be a state of a sheet in which the non-meltable fibers are interwound with one another well enough. Consequently, the reinforcing sheet can not stably be layered on and integrated with the thermoplastic resin foam sheet. Accordingly, the reinforcing sheet may unexpectedly separate from and leave the thermoplastic resin foam sheet when the multi-layer sheet is transformed. If the content of the non-meltable fiber in the reinforcing sheet is low, tensile strength and bending strength of the reinforcing sheet lower, wherefore 20~90 weight % is preferable, and 25~75 weight % is preferable.

If the non-meltable fibers are long, the non-meltable fibers in the reinforcing sheet are interwound with one another to the extent more than necessity requires, and when the multi-layer sheet is heated and formed, the interwound non-meltable fibers comprising the reinforcing sheet can not be smoothly swerved along the direction of the surface of the thermoplastic resin foam sheet and the reinforcing sheet is not transformed so as to be a state that follows the thermoplastic resin foam sheet. Consequently, such an unexpected event may happen that the reinforcing sheet separate from and leave the thermoplastic resin foam sheet. If the non-meltable fibers are short, the interwinding of the non-meltable fibers in the reinforcing sheet is raveled when the multi-layer sheet is formed and the bending strength of the obtained molding product may lower. Therefore, the length of the non-meltable fibers should preferably be 30~100 mm.

The above-mentioned non-meltable fibers of the reinforcing sheet are bound together with the thermoplastic resin. The thermoplastic resin is not particularly limited as far as the thermoplastic resin is what has been conventionally used as a binder for non-woven fabric. For example, polyolefin-based resins such as polyethylenes like low density polyethylene, straight-chain low density polyethylene, medium density polyethylene, high density polyethylene and so on, polypropylenes like isotactic polypropylene, syndiotactic polypropylene and so on, polybutene, ethylene-$\alpha$-olefin copolymer and so on; ethylene-propylene-diene terpolymer; ethylene-vinyl acetate copolymer; ethylene-acrylic ester copolymer; polystyrene-based resins such as polystyrene, polystyrene-based thermoplastic resin elastomer and so on; polyvinyl alcohol-based resins; saturated polyester-based resins; unsaturated polyester-based resins; acrylic-based resins such as polymethyl(metha)acrylate, polybutyl(metha)acrylate, poly-n-tetradecyl(metha)acrylate, poly-n-propyl (metha)acrylate, polyisobutyl(metha)acrylate and so on; urethane resins such as linear urethane resin and so on; epoxy resins; phthalic acid derivatives such as dimethyl phthalate, dimethyl isophthalate and so on; vinyl-acetate-based resins and so on are enumerated as the thermoplastic resin, among which polyolefin-based resins are preferable in view of a property of heat-adhesion with the thermoplastic resin foam sheet.

As the above-mentioned $\alpha$-olefin, propylene, 1-butene, 1-pentene, 1-hexene, 4-methyl-1-pentene, 1-heptene, 1-octene and so on are enumerated. As a copolymer containing an ethylene component, any one of a block copolymer, a random copolymer and a random block copolymer may be acceptable.

Further, if a melt index of the thermoplastic resin binding the above-mentioned non-meltable fibers together is high, the thermoplastic resin flows out of the reinforcing sheet when heated to form the multi-layer sheet and strength of the reinforcing sheet lowers, which may result in lowered bending strength of the multi-layer sheet. If the melt index is low, the fluidity of the thermoplastic resin binding the non-meltable fibers of the reinforcing sheet together lowers when the multi-layer sheet is formed, the non-meltable fibers comprising the reinforcing sheet can not be swerved smoothly according to the transformation of the thermoplastic resin foam sheet, the reinforcing sheet can not smoothly follow up the surface of the thermoplastic resin foam sheet, and moldability of the multi-layer sheet may lower. Therefore, the melt index should preferably be 20~60 g/10 minutes. In the meantime, the melt index in the present invention is what was determined according to Japanese Industrial Standard K7210.

In the meantime, as will be mentioned hereinafter, in case the thermoplastic resin sheet is layered on and integrated, as a surface layer, with the above-mentioned reinforcing sheet, part of the thermoplastic resin sheet melts and enter into the reinforcing sheet. In addition, in order to keep the reinforcing sheet being covered without fail, the thermoplastic resin sheet, whose melt index is 20 g/10 minutes or less, is usually used. Therefore, the melt index of the thermoplastic resin binding the non-meltable fibers of the reinforcing sheet is slightly lowered by the entrance of the thermoplastic resin comprising the surface layer, however, the slight lowering of the melt index has little influence because the amount of the thermoplastic resin binding the non-meltable fibers of the reinforcing sheet from the beginning or the amount of the thermoplastic resin provided by melted thermoplastic resin fibers, which will be described hereinafter, is extremely large compared to the amount of the thermoplastic resin, which comprises the surface layer and enters into the reinforcing sheet.

In manufacturing the non-woven fabric used in the above-mentioned reinforcing sheet, a conventional manufacturing method of non-woven fabric is applied. For example, the following conventional methods are suggested. Namely, the non-meltable fibers are made to be non-woven fabric by a water-free thermal bond method and a needle punch method, and wet sheet making method, and then melted thermoplastic resin is distributed into a gap among non-meltable fibers which are made to be the non-woven fabric. Another conventional method to manufacture the non-woven fabric, for example, is that after interwinding the non-meltable fibers and the thermoplastic resin fibers, the interwound thermoplastic resin fibers are melted to work as a binder, with which the interwound non-meltable fibers are bound together.

If a per-unit weight of the reinforcing sheet is large, center part of the multi-layer sheet sags down with the weight of the reinforcing sheet obtained from the sheet for reinforcement when the multi-layer sheet is heated to be molded. The sag results in a smaller aspect ratio of the bubbles of the thermoplastic resin foam sheet in the multi-layer sheet and may lower compressive strength of the obtained molding product. If the per-unit weight is small, bending strength of the multi-layer sheet may lower. Therefore, the per-unit weight should preferably be 10~70 g/m$^2$, and more preferably be 20~65 g/m$^2$.

Tensile strength of the reinforcing sheet should preferably be 2.94N/cm$^2$ or more for the following reason. Namely, as will be mentioned hereinafter, the above-mentioned multi-layer sheet is made by foaming an expandable multi-layer sheet comprising an expandable sheet and the sheet for reinforcement which is layered and integrated with the expandable sheet. When the expandable multi-layer sheet is foamed, foaming of the expandable sheet is limited by the sheet for reinforcement in a direction along the surface of the expandable sheet, while the foaming in a direction of a thickness is free. And the direction of the foaming is made directed to the direction of the thickness so as to make the bubbles of the obtained thermoplastic resin foam sheet formed to be spindle-shaped bubbles, whose longitudinal direction is directed to the direction of the thickness of the thermoplastic resin foam sheet. Namely, the aspect ratio Dz/Dxy of the spindle-shaped bubbles is regulated to be within the above-mentioned predetermined range.

Consequently, in case the tensile strength of the reinforcing sheet is small, the tensile strength of the sheet for reinforcement also becomes small. Accordingly, the foaming in the direction along the surface of the expandable sheet can not be effectively regulated by the sheet for reinforcement, the aspect ratio Dz/Dxy of the bubbles of the obtained foam sheet can not be within the predetermined range, and the obtained multi-layer sheet may not be provided with required compressive rigidity.

If a coefficient of linear expansion of the above-mentioned reinforcing sheet is large, the coefficient of linear expansion of the obtained multi-layer sheet also becomes large and degree of expansion and contraction of the multi-layer sheet by changes of a temperature becomes large. As a result, dimensional stability may lowers, and it may happen that the multi-layer sheet sags down by self-weight thereof at a high temperature. Therefore, the coefficient of linear expansion should preferably be $5 \times 10^{-5}$/° C. or less, and more preferably be $1 \times 10^{-5}$/° C. or less.

Further, the surface layer is layered on and integrated with a surface of the above-mentioned reinforcing sheet, and by additionally layering and integrating the surface layer on the surface of the reinforcing sheet like this, the surface layer works as a binder to more firmly bind the non-meltable fibers of the reinforcing sheet with one another, enabling the coefficient of linear expansion to lower, and as a result the obtained multi-layer sheet can be the one which is provided with high dimensional stability.

Furthermore, as the reinforcing sheet comprising the non-woven fabric is formed to be a state in which non-meltable fibers are disorderly interwound with one another, the surface of the reinforcing sheet is formed unevenly in which the non-meltable fibers disorderly project from the surface. Therefore, when a surface material is layered on the surface of the reinforcing sheet, it may happen that the surface material may not be stably layered due to the uneven surface attributed to the non-meltable fibers. However, by layering and integrating the surface layer on and with the surface of the reinforcing sheet as above-mentioned, the uneven surface of the above-mentioned reinforcing sheet attributed to the non-meltable fibers of the reinforcing sheet is covered and concealed to provide a smooth surface. The smooth surface enables the surface material to be stably and firmly layered on the surface of the multi-layer sheet, which makes integration of the surface material and the multi-layer sheet so firm as to prevent, without fail, such an unexpected event as separation and leaving of the surface material from the multi-layer sheet during molding method of the multi-layer sheet. Accordingly, even when the multi-layer sheet with the surface material layered on one side thereof is molded, it is possible to mold the multi-layer sheet by applying strong molding pressure to provide a complex shape accurately and without fail.

In the meantime, in case the reinforcing sheets are layered on and integrated with both sides of the above-mentioned foam sheet, the surface layer may be layered on and integrated with one of the reinforcing sheets.

The above-mentioned surface layer is not particularly limited as far as the surface layer is what can cover the reinforcing sheet. For example, the surface layer should preferably comprises such thermoplastic resins as polystyrene, polyethylene, polypropylene, polybutene, nylon, polyethylene terephthalate and so on, and should preferably be compatible with one or both of the thermoplastic resin of the reinforcing sheet and the thermoplastic resin comprising the thermoplasic resin foam sheet.

The thermoplastic resin comprising the above-mentioned surface layer and the thermoplastic resin comprising the above-mentioned thermoplastic resin foam sheet are made to be compatible, and by having the thermoplastic resin comprising the above-mentioned surface layer entered into the gap of the non-meltable fibers comprising the above-mentioned reinforcing sheet to reach the surface of the above-mentioned thermoplastic resin foam sheet in order to be integrated with the thermoplastic resin foam sheet, the above-mentioned reinforcing sheet can firmly be kept layered on the surface of the thermoplastic resin foam sheet stably. Accordingly, even when the multi-layer sheet is heated and molded, the multi-layer sheet can be molded to provide a complex shape without fail by applying stronger molding pressure onto the multi-layer sheet without causing such an unexpected event like letting the reinforcing sheet separate from and leave the thermoplastic resin foam sheet. In addition, when the thermoplastic resin comprising the surface layer, the thermoplastic resin of the reinforcing sheet (the thermoplastic resin fibers of the sheet for reinforcement) and the thermoplastic resin comprising the thermoplastic resin foam sheet are made to be compatible with one another, the above-mentioned actions and effects can be demonstrated more certainly.

Further, as the above-mentioned surface layer covers the non-meltable fibers comprising the reinforcing sheet in a state of wrapping-up, when the multi-layer sheet is heated and molded, the non-meltable fibers comprising the reinforcing sheet are put in a free state as if the non-meltable fibers float in the thermoplastic resin. Namely, as the non-meltable fibers are in the state of free floating in the thermoplastic resin, the interwound non-meltable fibers can be swerved smoothly in the direction along the surface of the thermoplastic resin foam sheet, following up the transformation of the thermoplastic resin foam sheet of the multi-layer sheet, whereby the reinforcing sheet is transformed in a direction along the surface of the thermoplastic resin foam sheet smoothly and without fail according to the transformation of the thermoplastic resin foam sheet, and such an unexpected event does not happen that the reinforcing sheet separates from and leaves the surface of the thermoplastic resin foam sheet. Therefore, there is an excellent effect that when the multi-layer sheet is formed the multi-layer sheet can be molded to provide a complex shape without fail by applying stronger molding pressure onto the multi-layer sheet.

If the surface layer is thick, the lightweight property of the obtained multi-layer sheet may lower, and if the surface layer is thin, the effect of the surface layer being layered on and integrated with the reinforcing sheet may not be demonstrated enough. Therefore, the thickness of the surface layer should preferably be 10200 $\mu$m.

Now, a manufacturing method of the multi-layer sheet is explained hereinafter. The manufacturing method of the multi-layer sheet is not particularly limited. For example, the following methods are suggested. Namely, ① modified thermoplastic resin is made by adding a multifunctional monomer to a thermoplastic resin to have the thermoplastic resin reacted with the multifunctional monomer, a pyrolysis-type foaming agent is added to the modified thermoplastic resin, the modified thermoplastic resin is melted and kneaded at a temperature lower than a decomposition temperature of the pyrolysis-type foaming agent, and after an expandable sheet is formed, an expandable multi-layer sheet is formed by having a sheet for reinforcement comprising non-woven fabric in which non-meltable fibers and synthetic resin fibers are interwound with one another layered on one side of the expandable sheet and a surface sheet is further layered on the sheet for reinforcement of the expandable multi-layer sheet in order to cover and conceal the sheet for reinforcement all over, the expandable multi-layer sheet is heated at a temperature higher than a reaction temperature of the multifunctional monomer and higher than a decomposition temperature of the pyrolysis-type foaming agent to have this foamed and the synthetic resin fibers of the reinforcing sheet is melted to have the non-meltable fibers bound with one another, and the multi-layer sheet is provided. ② A An expandable resin composite containing a thermoplastic resin, a crosslinking agent and a pyrolysis-type foaming agent is melted and kneaded at a temperature lower than a reaction temperature of the crosslinking agent and the decomposition temperature of the pyrolysis-type foaming agent and an expandable sheet is formed, and before or after the expandable sheet is provided with a crosslinking structure by applying electrolytically dissociatable radiation to the expandable sheet, an expandable multi-layer sheet is formed by having a sheet for reinforcement, comprising a non-woven fabric, in which non-meltable fibers and synthetic resin fibers are interwound with one another, layered on one side of the expandable sheet, and a surface sheet is further layered on the sheet for reinforcement of the expandable multi-layer sheet in order to cover and conceal the sheet for reinforcement all over, the expandable multi-layer sheet is heated to a temperature higher than the decomposition temperature of the pyrolysis-type foaming agent, and the synthetic resin fibers of the reinforcing sheet are melted to bind the non-meltable fibers with one another and thus the multi-layer sheet is provided. ③ A modified thermoplastic resin is made by adding a multifunctional monomer to a thermoplastic resin and then having the thermoplastic resin reacted with the multifunctional monomer, a pyrolysis-type foaming agent is added to the modified thermoplastic resin which is melted and kneaded at the temperature lower than the decomposition temperature of the pyrolysis-type foaming agent to form an expandable sheet, and after an expandable multi-layer sheet is formed by having a sheet for reinforcement, comprising a non-woven fabric in which non-meltable fibers are interwound with one another and the non-meltable fibers are bound together by the thermoplastic resin, layered on one side of the expandable sheet, and a surface sheet is further layered on the sheet for reinforcement of the expandable multi-layer sheet in order to cover and conceal the sheet for reinforcement all over, the expandable multi-layer sheet is heated to the temperature higher than the reaction temperature of the multifunctional monomer and the decomposition temperature of the pyrolysis-type foaming agent and in order to provide the multi-layer sheet. ④ An expandable resin composite containing a thermoplastic resin, a crosslinking agent and a pyrolysis-type foaming agent is melted and kneaded at the temperature lower than the reaction temperature of the crosslinking agent and the decomposition temperature of the pyrolysis-type foaming agent to form the expandable sheet, and before or after the expandable sheet is provided with the crosslinking structure by applying electrolytically dissociatable radiation to the expandable sheet, an expandable multi-layer sheet is formed by having a sheet for reinforcement, comprising a non-woven fabric in which non-meltable fibers are interwound with one another and non-meltable fibers are bound together by the thermoplastic resin, layered on one side of the expandable sheet, and a surface sheet is further layered on the sheet for reinforcement of the expandable multi-layer sheet in order to cover and conceal the sheet for reinforcement all over, and then the expandable multi-layer sheet is heated to the temperature higher than the decomposition temperature of the pyrolysis-type foaming agent and thus the multi-layer sheet is provided. As will be described hereinafter, the above-mentioned manufacturing methods ① and ② are preferable in view of excellent moldability of the obtained multi-layer sheet.

In the meantime, in the above manufacturing methods ①~④, when the above-mentioned sheet for reinforcement is layered on the above-mentioned expandable sheet, the sheet for reinforcement and the expandable sheet may be integrated in advance, or the sheet for reinforcement may be layered on the expandable sheet without integrating the expandable sheet with the sheet for reinforcement, and when the expandable multi-layer sheet is foamed, the thermoplastic resin foam sheet obtained from the expandable sheet and the sheet for reinforcement may be integrated with each other by utilizing the foaming pressure.

The above-mentioned pyrolysis-type foaming agent is not particularly limited as far as the pyrolysis-type foaming agent is what is generally used for manufacturing foamed products. For example, such inorganic pyrolysis-type foaming agents as sodium bicarbonate, ammonium carbonate, ammonium bicarbonate, azide compounds and so on, and such organic pyrolysis-type foaming agents as azodicarbonamide, azobisisobutylonitryl, dinytrosopenta methylene tetramine, benzenesulphonyl hydrazide, toluensulfonyl hydrazide, 4,4-oxybis (benzenesulphonyl hydrazide), azodicarboxylic acid barium, trihydrazinotriazine, p-toluene-sulfonyl semicarbazide and so on, are enumerated.

If an amount of addition of the foaming agent is large, bubbles may be broken, and if the amount is small, foam may not be made. Therefore, the amount of the foaming agent should preferably be 1~50 weight parts to 100 weight parts of the thermoplastic resin.

Specific manufacturing methods of the expandable sheet are, for example, as follows. ① After peroxide is added to the thermoplastic resin and the multifunctional monomer as necessity requires, the thermoplastic resin and the multifunctional monomer are fed to the extruder to allow the multifunctional monomer to react to the thermoplastic resin to provide the modified thermoplastic resin, and after the pyrolysis-type foaming agent is added to the modified thermoplastic resin in the extruder, the modified thermoplastic resin is melted and kneaded at a temperature lower than the decomposition temperature of the pyrolysis-type foaming agent, and is extruded to make a form of sheet in order to manufacture the expandable sheet. ② The thermoplastic resin, the crosslinking agent and the pyrolysis-type foaming agent are fed to the extruder, melted and kneaded at a temperature lower than the reaction temperature of the crosslinking agent and the decomposition temperature of the pyrolysis-type foaming agent, and extruded to make a form of sheet in order to manufacture the expandable sheet.

In case the ② of the above-mentioned manufacturing methods of the expandable sheet is adopted, the electrolytically dissociatable radiation is applied to provide the thermoplastic resin, which comprises the expandable sheet, with the crosslinking structure as above-mentioned, before or after the sheet for reinforcement is layered on one side of the expandable sheet in a manner as will be described hereinafter.

Further, the sheet for reinforcement is layered on one side or on both sides of the expandable sheet. The sheet for reinforcement is the non-woven fabric in which non-meltable fibers and the thermoplastic resin fibers are interwound with one another, or is the non-woven fabric in which the non-meltable fibers are interwound with one another and the non-meltable fibers are bound together with the thermoplastic resin. However, as will be mentioned hereinafter, it is preferable to use the sheet for reinforcement in which the non-meltable fibers and the thermoplastic resin fibers are interwound with one another because the obtained mlti-layer sheet is provided with excellent moldability.

In the meantime, in manufacturing the non-woven fabric in which the non-meltable fibers and the thermoplastic resin fibers are interwound with one another, a conventional manufacturing method of the non-woven fabric is adopted. For example, a water-free thermal bond method and a needle punch method, and a wet sheet making method, in which the non-meltable fibers and the thermoplastic resin fibers are treated, are enumerated. In manufacturing the non-woven fabric in which the non-meltable fibers are interwound with one another and the non-meltable fibers are bound with the thermoplastic resin, a conventional manufacturing method of the non-woven fabric is adopted. For example, such a manufacturing method and the like are enumerated that the non-meltable fibers are made to be the non-woven fabric by a water-free thermal bond method and a needle punch method, and a wet sheet making method, and then the melted thermoplastic resin is distributed into a gap among non-meltable fibers which was made to be the non-woven fabric, by which the non-meltable fibers are bound together with the thermoplastic resin.

As the above-mentioned thermoplastic resin fibers, for example, polyolefin-based resins such as polyethylenes like low density polyethylene, straight-chain low density polyethylene, medium density polyethylene, high density polyethylene and so on, polypropylenes like isotactic polypropylene, syndiotactic polypropylene and so on, polybutene, ethylene-α-olefin copolymer and so on; ethylene-propylene-diene terpolymer; ethylene-vinyl acetate copolymer; ethylene-acrilic ester copolymer; such polystyrene-based resins as polystyrene, polystyrene-based thermoplastic resin elastomer and so on; polyvinyl-alcohol-based resins; saturated polyester-based resins; unsaturated polyester-based resins; such acrylic resins as polymethyl(metha)acrylate, polybutyl (metha)acrylate, poly-n-tetradecyl(metha)acrylate, poly-n-propyl(metha)acrylate, polyisobutyl(metha)acrylate and so on; such urethane resins as linear urethane resin and so on; epoxy resin; such phthalic acid derivatives as dimethyl phthalate, dimethyl isophthalate and so on; and vinyl-acetate-based resins are enumerated. Among those mentioned above, fibers made of polyolerin-based resins are preferable in view of the heat-adhesion property with the thermoplastic resin foam sheet.

In case the sheet for reinforcement in which the non-meltable fibers and the thermoplastic resin fibers are interwound with one another is used, the reinforcing sheet is formed by melting the thermoplastic resin fibers of the sheet for reinforcement by heating of the expandable multi-layer sheet in later process, and then by binding the interwound non-meltable fibers together by using the melted thermoplastic resin as the binder. The reinforcing sheet is layered on and integrated with the thermoplastic resin foam sheet provided by foaming the expandable sheet. In case the sheet for reinforcement in which the non-meltable fibers are interwound with one another and the non-meltable fibers are bound together by the thermoplastic resin is used, the sheet for reinforcement is made to be the reinforcing sheet, and the reinforcing sheet is layered on and integrated with the thermoplastic resin foam sheet provided by foaming the expandable sheet.

When the sheet for reinforcement is used, in which non-meltable fibers and the thermoplastic resin fibers are interwound with one another, in particular, in a manner as above-mentioned, the following excellent effect is demonstrated. Namely, as will be described hereinafter, the thermoplastic resin fibers of the sheet for reinforcement are melted, whereby a form and a state of the fibers almost disappear, and work as a binder to bind the non-meltable fibers together. By interwinding the non-meltable fibers and the thermoplastic resin fibers in advance, the thermoplastic resin fibers can be positioned in advance in the gap formed by the non-meltable fibers interwound with one another. By melting the thermoplastic resin fibers positioned in the gap of the interwound non-meltable fibers, the thermoplastic resin to work as the binder can be supplied to the minute gap of the interwound non-meltable fibers, and the non-meltable fibers can be bound together evenly, finely and firmly, whereby the obtained reinforcing sheet can be the one in which non-meltable fibers are bound together evenly and firmly by the thermoplastic resin.

Accordingly, the reinforcing sheet, which can be obtained in the above-mentioned manner by using the sheet for reinforcement comprising the non-woven fabric, in which the non-meltable fibers and the thermoplastic resin fibers are interwound with one another, has excellent bending strength. In addition, as the non-meltable fibers of the above-mentioned reinforcing sheet are bound together in a state that the thermoplastic resin as a binder, being distributed evenly all over the reinforcing sheet, intervenes, even when the multi-layer sheet is heated and molded, the melted thermoplastic resin which intervenes in the gap of the non-meltable fibers works as a lubricant, whereby the non-meltable fibers are swerved smoothly and firmly along the direction of the surface of the thermoplastic resin foam sheet following the transformation of the thermoplastic resin foam sheet of the multi-layer sheet. Namely, the above-mentioned reinforcing sheet is smoothly transformed following the transformation of the thermoplastic resin foam sheet, and such an unexpected event does not happen that the reinforcing sheet separates from and leaves the surface of the thermoplastic resin foam sheet, wherefore the multi-layer sheet can be molded to provide a complex shape without fail and accurately by applying strong molding stress onto the multi-layer sheet.

If a per-unit weight of the sheet for reinforcement is large, center part of the multi-layer sheet sags down with the weight of the reinforcing sheet obtained from the sheet for reinforcement, when the multi-layer sheet is heated to be molded. The sag results in a lowered aspect ratio of the bubbles of the thermoplastic resin foam sheet in the multi-layer sheet and may lower compressive strength of the molding product. If the per-unit weight is small, bending strength of the multi-layer sheet may lower. Therefore, the per-unit weight should preferably be 10~70 g/m$^2$, and more preferably be 20~50 g/m$^2$.

In the meantime, in case the thermoplastic resin sheet is layered on the surface of the sheet for reinforcement in a manner as will be mentioned hereinafter, as part of the thermoplastic resin sheet enters into the sheet for reinforcement and the per-unit weight of the obtained reinforcing sheet increases, the per-unit weight of the sheet for reinforcement should preferably be regulated to be 8~65 g/m$^2$, taking into consideration an amount of the increase resulting from the part of the thermoplastic resin sheet entering into the sheet for reinforcement.

Further, if a content of the above-mentioned non-meltable fibers in the sheet for reinforcement is high, a content of the thermoplastic resin in the reinforcing sheet becomes comparatively low wherefore a state of sheet can not be formed in which the non-meltable fibers are interwound with one another well enough. Consequently, the reinforcing sheet can not stably be layered on and integrated with the thermoplastic resin foam sheet. Accordingly, the reinforcing sheet may unexpectedly separate from and leave the thermoplastic resin foam sheet when the multi-layer sheet is transformed. If the content of the non-meltable fiber in the sheet for reinforcement is low, tensile strength and bending strength of the reinforcing sheet lower, wherefore 20~90 weight % is preferable, and 25~75 weight % is preferable.

In the meantime, in case the thermoplastic resin sheet is layered on the surface of the sheet for reinforcement in a manner as will be mentioned hereinafter, part of the thermoplastic resin sheet enters into the sheet for reinforcement and the content of the non-meltable fibers in the obtained reinforcing sheet comparatively lowers. Therefore, taking into consideration the amount of the increase resulting from the part of the thermoplastic resin sheet entering into the sheet for reinforcement, the content of the non-meltable fibers should preferably be 22~95 weight % and preferably be 27~80 weight %.

Processes to layer and integrate the sheet for reinforcement on and with one side or on both sides of the expandable sheet are, for example, as follows. ① The sheet for reinforcement is pressed onto the surface of the expandable sheet while being heated for layering and integration. ② The sheet for reinforcement is pressed onto the surface of the expandable sheet, which is in a state of melt, for layering and integration. In other words, the expandable sheet is extruded from a T-die mounted to a tip of the extruder. Then the sheet for reinforcement is placed on one side of the expandable sheet, whose surface is in a state of melt soon after being extruded, and is supplied between a pair of cooling rolls by which the expandable sheet and the sheet for reinforcement are held and are integrated with each other, whereby the sheet for reinforcement is layered on and integrated with one side of the expandable sheet. ③ The expandable sheet and the sheet for reinforcement are layered and integrated together via an adhesive. The above-mentioned ① is preferable because fine regulation of a thickness of the expandable multi-layer sheet can be done.

In order that an additional surface layer should be layered on and integrated with the surface of the reinforcing sheet, such method, for example, is suggested that a surface sheet and the sheet for reinforcement is layered on one side of the expandable sheet in a manner that the sheet for reinforcement is positioned inside, and then heated to a softening temperature of the surface sheet or over in order to have the sheet for reinforcement and the surface sheet layered on and integrated with the expandable sheet. And the surface sheet is melted to be layered on and integrated with the reinforcing sheet obtained from the sheet for reinforcement to structure the layer surface.

As the above-mentioned surface sheet, the thermoplastic resin sheet comprising such thermoplastic resins and the non-woven fabric formed with the fibers comprising such thermoplastic resins as polyolefin-based resins such as polyethylenes like low density polyethylene, straight-chain low density polyethylene, medium density polyethylene, high density polyethylene and so on, polypropylenes like isotactic polypropylene, syndiotactic polypropylene and so on, polybutene, ethylene-α-olefin copolymer and so on; as ethylene-propylene-diene terpolymer; as ethylene-vinyl acetate copolymer; as ethylene-acrylic ester copolymer; as polystyrene-based resins like polystyrene, polystyrene-based thermoplastic resin elastomer and so on; as polyvinyl alcohol-based resins; as saturated polyester-based resins; as unsaturated polyester-based resins; as acrylic-based resins like polymethyl(metha)acrylate, polybutyl(metha)acrylate, poly-n-tetradecyl(metha)acrylate, poly-n-propyl(metha)acrylate, polyisobutyl(metha)acrylate and so on, as urethane resins like linear urethane resin; as epoxy resins; as phthalic acid derivatives like dimethylphthalate, dimethylisophthalate and so on; as vinyl-acetate-based resins and so on are enumerated. The polyolefin-based resin sheet and the non-woven fabric made of the polyolefin-based resin fibers are preferable. In the meantime, in case the non-woven fabric comprising the fibers made of the thermoplastic resins is used as the surface sheet, the fibers comprising the surface sheet are melted by heat wherefore the form and state of the fibers disappear, and the obtained surface layer is formed to be a smooth surface. Further, the surface sheet also includes what is called a film which is thin.

As a method for heating of the expandable multi-layer sheet made in the above-mentioned manner, an ordinary heating apparatus which has been conventionally used for manufacturing foamed products is used. For example, a roll-type heating apparatus or a belt-type heating apparatus in which the expandable multi-layer sheet is supplied between a pair of heater-rolls or a pair of heater-belts arranged oppositely to each other to heat the expandable multi-layer sheet, a hot air thermostat in which hot blast is applied to the expandable multi-layer sheet, an oil bath, a metal bath and salt bath in which the expandable multi-layer sheet is bathed in heat are enumerated.

When the expandable sheet of the expandable multi-layer sheet is foamed in a manner as mentioned above, as the sheet for reinforcement is layered on and integrated with one side of the expandable sheet, in foaming of the expandable sheet, foaming in a direction along the surface is limited by the sheet for reinforcement, and on the other hand foaming in a direction of the thickness is in a state of free-foaming without being limited by the sheet for reinforcement.

Thus the foaming direction of the above-mentioned expandable sheet is limited to be directed in the direction of the thickness, and the bubbles of the thermoplastic resin foam sheet provided by foaming the expandable sheet are formed to be spindle-shaped, in which the longitudinal direction is directed to the direction of the thickness of the expandable sheet and the bubbles have an aspect ratio Dz/Dxy within a predetermined range.

Accordingly, most of the bubbles of the thermoplastic resin foam sheet are formed to be spindle-shaped whose longitudinal direction is directed to the direction of the thickness of the thermoplastic resin foam sheet, wherefore, the obtained multi-layer sheet has an excellent compressive strength in the direction of the thickness, while maintaining a lightweight property as the multi-layer sheet partly comprises the thermoplastic resin foam sheet.

In addition, the multi-layer sheet is also excellent in bending strength as the multi-layer sheet comprises the foam sheet and the reinforcing sheet, which reinforcing sheet comprises the non-woven fabric formed with the interwound non-meltable fibers bound with the thermoplastic resin fibers, and which reinforcing sheet is layered on and integrated with one side of the foam sheet of the multi-layer sheet.

Further, as the above-mentioned multi-layer sheet comprises the thermoplastic resin foam sheet, which is excellent in mouldability, on and with one side of which the reinforcing sheet is layered and integrated, the multi-layer sheet can be molded to be a required shape by such general molding methods as a thermopressing method, a cold-press method, vacuum press method and so forth. The thermopressing method means a method in which thermoforming is carried out with an ordinary compression molding press. The cold press method means a method in which the surface of the multi-layer sheet is heated to exceed a softening point of the foam sheet, namely, to be specific, to a surface temperature of 160~210° C. and then the multi-layer sheet is formed in the male-female metal mold which is kept at a temperature less than the softening point of the foam sheet, namely and specifically at 10~70° C.

If the heating temperature of the multi-layer sheet in the above-mentioned cold press method is high, the thermoplastic resin foam sheet of the multi-layer sheet is melted, the aspect ratio of the thermoplastic resin foam sheet lowers, and the compressive strength of the obtained molding product may lower. If the temperature is low, molding of the multi-layer sheet becomes insufficient and may not be molded to a required shape, or mold distortion remains in the obtained molding product and the dimensional stability of the molding product may lower. Therefore, 160~210° C. is preferable.

Further, if the heating temperature of the male-female metal mold in the above-mentioned cold press method is high, cooling of the obtained molding product becomes insufficient and dimension of the molding product may change as time goes by. If the temperature is low, molding of the multi-layer sheet becomes insufficient and may not be molded to a required shape, or mold distortion remains in the obtained molding product and the dimensional stability of the molding product may lower. Therefore, 10~70° C. is preferable.

If the bending elasticity slope of the above-mentioned multi-layer sheet is small, there is a misgiving that a worker may bend and break the multi-layer sheet by mistake when the worker handles the multi-layer sheet. Therefore, the bending elasticity slope is limited to 78.4N/50 mm/cm or above, should preferably be 117.6 n/50 mm/cm and more preferably be 156.8N/50 mm/cm.

The bending elasticity slope of the multi-layer sheet represents a value indicating a resistance against a load applied to the multi-layer sheet in the direction of the thickness thereof, and was determined on a piece of the multi-layer sheet of 15 cm long, 50 cm wide and 6.5 cm thick, according to Japanese Industrial Standard K7203.

In addition, if a per-unit strength of the multi-layer sheet is small, there is a misgiving that a worker may bend and break the multi-layer sheet by mistake when the worker handles the multi-layer sheet. Therefore, the per-unit strength should preferably be 98N/50 mm/cm/kg/m$^2$ or more, and more preferably be 117.6 N/50 mm/cm/kg/m$^2$ or more. The per-unit strength is found by dividing the bending elasticity slope by the per-unit weight.

If a coefficient of linear expansion of the multi-layer sheet is large, the dimensional stability of the molding product obtained from the multi-layer sheet lowers and installation stability of the molding product which is installed at a required position lowers. Therefore, the coefficient of linear expansion of the multi-layer sheet should preferably be $6.0 \times 10^{-5}/°$ C. or less.

Lastly, in case the surface layer is layered on the above-mentioned multi-layer sheet, it sometimes can not be recognized whether the thermoplastic resin in the reinforcing sheet is the thermoplastic resin binding the non-meltable fibers of the sheet for reinforcement together, the melted thermoplastic resin fibers of the sheet for reinforcement, or the thermoplastic resin comprising the surface layer, which was entered into the reinforcing sheet. However, such a point as above is not particularly a matter of question in the present invention. Namely, it is sufficient as far as the interwound non-meltable fibers comprising the reinforcing sheet of the obtained multi-layer sheet are bound together with the thermoplastic resin in one way or another.

As described above, as the multi-layer sheet according to the present invention comprises the thermoplastic resin foam sheet and the reinforcing sheet layered on and integrated with at least one side of the thermoplastic resin foam sheet, in which the reinforcing sheet comprises the non-woven fabric where non-meltable fibers are interwound with one another and are bound together with synthetic resin, and in which bubbles of the thermoplastic resin foam sheet have an aspect ratio $Dz/Dxy$ of 1.2 or more, and an expansion ratio of 5~50 cc/g, and furthermore, by layering and integrating a surface layer on and with the surface of the reinforcing sheet, an uneven surface attributed to the non-meltable fibers of the above-mentioned reinforcing sheet is covered and concealed to form a smooth surface, the multi-layer sheet has excellent bending strength and compressive strength in a direction of the thickness thereof.

In particular, in the thermoplastic resin foam sheet of the multi-layer sheet, as the longitudinal direction of the bubbles is made directed to the direction of the thickness of the multi-layer sheet and the bubbles have the aspect ratio $Dz/Dxy$ within a predetermined range, the thermoplastic resin foam sheet maintains the excellent compressive strength in the direction of the thickness even when the expansion ratio is raised.

Consequently, in the multi-layer sheet according to this invention, as the thermoplastic resin foam sheet, the one with high expansion ratio may be used, which is excellent in bending strength and compressive strength while maintaining the high lightweight property.

Further, as the reinforcing sheet is layered on and integrated with one side of the thermoplastic resin foam sheet whereby almost no dimensional fluctuation according to changes of a temperature takes place, the multi-layer sheet according to the present invention has an excellent dimensional stability.

In addition, the surface layer is layered on the surface of the reinforcing sheet and the unevenness due to the non-meltable fibers comprising the reinforcing sheet is covered and concealed by the surface layer to form the smooth surface, whereby in case a surface material or the like is layered on the multi-layer sheet, the surface material or the like can be firmly layered on and integrated with the smooth surface layer in a state of close adherence without fail.

Accordingly, even when a strong molding stress is applied to the multi-layer sheet layered with the surface material, such unexpected events as separation and leaving of the surface material do not occur since the surface material is firmly layered on and integrated with the surface layer of the multi-layer sheet, wherefore the multi-layer sheet can be molded to provide a complex form with accuracy and without fail by applying strong molding pressure onto the multi-layer sheet.

Further, as described in claim 2, in case the per-unit weight of the reinforcing sheet is made to be 10~70 g/m², when the multi-layer sheet is heated and molded, such an unexpected event does not happen that the thermoplastic resin foam sheet in a softened state sags down with a weight of the reinforcing sheet and the aspect ratio of the bubbles thereof lowers, whereby the molding product with the excellent compressive strength can be obtained.

Furthermore, as described in claim 3, in case a content of the non-meltable fibers in the reinforcing sheet is made to be 20~90 weight %, the reinforcing sheet, in which non-meltable fibers are interwound in a good condition and which has excellent tensile strength, can be layered on and integrated with the one side of the thermoplastic resin foam sheet stably and firmly, wherefore such an event does not happen that the reinforcing sheet unexpectedly separates from and leaves the surface of the thermoplastic resin foam sheet. Accordingly, the multi-layer sheet can be molded to provide a complex shape by applying strong molding stress.

Furthermore, as described in claim 4, in case a fiber length of the non-meltable fibers is 30~100 mm, the non-meltable fibers in the reinforcing sheet are interwound with one another to such an extent that the non-meltable fibers can be swerved smoothly in the direction along the surface of the thermoplastic resin foam sheet and are interwound firmly, wherefore the obtained multi-layer sheet has an excellent bending strength.

Furthermore, as the non-meltable fibers in the reinforcing sheet can be smoothly swerved in the direction along the surface of the thermoplastic resin foam sheet following the transformation of the thermoplastic resin foam sheet, the reinforcing sheet smoothly follows up the transformation of the thermoplastic resin foam sheet and is transformed, wherefore such an unexpected event does not happen that the reinforcing sheet separates from and leaves the surface of the thermoplastic resin foam sheet. Accordingly, the multi-layer sheet can be molded to provide a complex shape by applying strong molding stress.

Furthermore, as described in claim 5, in case a melt index of the thermoplastic resin binding the non-meltable fibers of the reinforcing sheet together is 20~60 g/10 minutes, when the multi-layer sheet is heated and molded, the thermoplastic resin binding the non-meltable fibers together works as a lubricant and helps the non-meltable fibers being swerved in a direction along the surface of the thermoplastic resin foam sheet. Accordingly, the non-meltable fibers smoothly and without fail follows up the transformation of the above-mentioned thermoplastic resin foam sheet and are swerved in a direction along the surface of the thermoplastic resin foam sheet. In other words, the reinforcing sheet smoothly follows up the transformation of the thermoplastic resin foam sheet and transforms wherefore the reinforcing sheet does not separate from and leaves the thermoplastic resin foam sheet unexpectedly. Accordingly, the multi-layer sheet can be molded to provide a complex shape by applying a strong molding stress.

Furthermore, as described in claim 7, in case the surface layer comprises the thermoplastic resin which is compatible with the thermoplastic resin comprising reinforcing sheet, when the multi-layer sheet is heated and transformed, the non-meltable fibers comprising the reinforcing sheet are in a state of being covered with the thermoplastic resin existing in the reinforcing sheet as the binder and with the thermoplastic resin comprising the surface layer. In other words, the non-meltable fibers comprising the reinforcing sheet are in such a state as floating in these melted thermoplastic resins. Accordingly, the non-meltable fibers comprising the above-mentioned reinforcing sheet can be swerved very smoothly in a direction along the surface of the thermoplastic resin foam sheet following up the transformation of the thermoplastic resin foam sheet.

Accordingly, the above-mentioned reinforcing sheet smoothly and without fail follows up the transformation of the thermoplastic resin foam sheet of the multi-layer sheet, and the reinforcing sheet does not unexpectedly separate from and leave the surface of the thermoplastic resin foam sheet, wherefore the multi-layer sheet can be molded to provide a complex shape accurately and without fail by applying a strong molding stress on the multi-layer sheet.

In addition, as the thermoplastic resin comprising the above-mentioned surface layer enters into the above-mentioned reinforcing sheet and also works as a binder to bind the non-meltable fibers together, the reinforcing sheet has an excellent tensile strength, wherefore the obtained multi-layer sheet also has such mechanical strengths like an excellent bending strength, an excellent compressive strength and so on.

Moreover, as described in claim 8, in case the thermoplastic resin comprising the surface layer enters into the reinforcing sheet and is integrated with the thermoplastic resin foam sheet, the reinforcing sheet is covered with the surface layer and is integrated with the surface of the thermoplastic resin foam sheet firmly and without fail.

Accordingly, the reinforcing sheet does not separate from and leave the surface of the thermoplastic resin foam sheet unexpectedly, wherefore the multi-layer sheet can be molded to provide a complex shape accurately and without fail by applying a strong molding stress on the multi-layer sheet.

Furthermore, as the manufacturing method described in claim 10 or 11, in case the sheet for reinforcement, comprising the non-woven fabric formed in a manner that the non-meltable fibers and the thermoplastic resin fibers are interwound with one another, is layered on one side of the expandable sheet and thereafter the expandable sheet is foamed and the synthetic resin fibers of the sheet for reinforcement is melted to work as a binder binding the non-meltable fibers together, the thermoplastic resin fibers are arranged in the minute gap among the interwound non-meltable fibers in advance, and the thermoplastic resin fibers in this state are melted to be able to be distributed in the gap among the interwound non-meltable fibers to work as the binder, whereby the non-meltable fibers of the obtained reinforcing sheet are bound together evenly, finely and firmly by the thermoplastic resin, and has an excellent bending strength, and the obtained multi-layer sheet is also excellent in such mechanical strengths as bending strength, compressive strength and so on.

In addition, as mentioned above, the thermoplastic resin working as a binder in the reinforcing sheet is evenly distributed in the reinforcing sheet, and the non-meltable fibers are evenly bound together overall by the evenly distributed thermoplastic resin. Therefore even when the reinforcing sheet is transformed according to the transformation of the thermoplastic resin form sheet, the non-meltable fibers are evenly swerved overall in a direction of the surface of the thermoplastic resin foam sheet and such an unexpected event does not happen that distortion remains in part of the reinforcing sheet. Consequently, the molding product provided by molding the multi-layer sheet has an excellent dimensional stability.

Further more, the non-meltable fibers in the reinforcing sheet are swerved smoothly according to the transformation of the thermoplastic resin foam sheet, and the reinforcing sheet is smoothly transformed according to the transformation of the thermoplastic resin foam sheet and does not separate from and leave the surface of the thermoplastic resin foam sheet unexpectedly, wherefore the multi-layer sheet can be molded to provide a complex shape accurately and without fail by applying a strong molding stress on the multi-layer sheet.

And, in manufacturing the above-mentioned multi-layer sheet, by such simple manners as layering the sheet for reinforcement on one side of the expandable sheet to provide the expandable multi-layer sheet and then heating and foaming the expandable multi-layer sheet, the excellent multi-layer sheet, which has excellent mechanical strengths such as the above-mentioned bending strength, compressive strength and so on, lightweight property, dimensional stability and moldability, can be manufactured easily and without fail.

BEST FORMS OF EMBODIMENTS OF THE INVENTION

Embodiment 1

Figure 1:
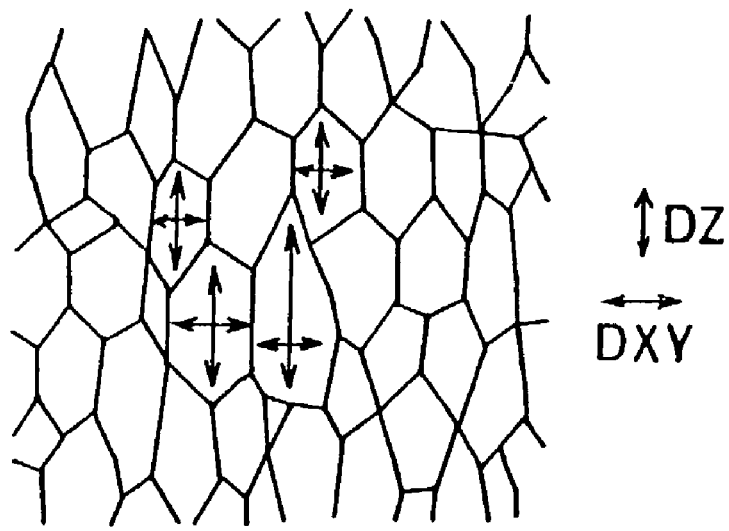
FIG. 1 shows a cross-sectional shape of the bubbles of the thermoplastic resin foam sheet of the multi-layer sheet cut in a direction of a thickness.

An apparatus mentioned below was used in order to manufacture an expandable polypropylene sheet. Namely, a manufacturing apparatus was used in which a same-directional rotating twin screw extruder (manufactured by Nippon Steel Co., Ltd., trade name "TEX-44", referred to as "second extruder" hereinafter) which is connected to a tip of a same-directionally rotating twin screw extruder (Plastic Engineering Research Institute, trade name "BT40", referred to as "first extruder") via an adaptor.

The first extruder is equipped with a self-wiping double screw whose L/D is 35 and whose D (diameter) is 39 mm. A cylinder barrel is sectioned into four barrels from a first barrel at upper reaches to a fourth barrel at lower reaches of the extruder, and an adaptor is equipped at a tip of the fourth barrel which adaptor can be continuously connected to the TEX-44 type same-directionally rotating twin screw extruder.

In the meantime, in order to collect components which is volatilized in the cylinder barrel, being the modifying monomer in particular, the fourth barrel is equipped with a vacuum vent. In the following operations, a temperature of the first barrel of the first extruder was set to be 180° C., a temperature of the second to the fourth barrels was set to be 220° C. and number of rotation of the screw was set to be 150 rpm.

The above-mentioned second extruder is equipped with a self-wiping double screw, whose L/D was 45.5 and whose D was 47 mm. The cylinder barrel is sectioned into twelve barrels from a first barrel at upper reaches to a twelfth barrel at lower reaches of the extruder, and at a tip of the twelfth barrel a coat-hanger die of 1500 mm wide is equipped.

Further, the sixth barrel is equipped with a side-feeder in order to feed a foaming agent, and the eleventh barrel is equipped with a vacuum vent in order to collect components volatilized in the cylinder barrel.

In the following operations, the first barrel of the second extruder was cooled all the time and a temperature of the second barrel to the fourth barrel was set to be 150° C., a temperature of the fifth barrel to the eighth barrel was set to be 170° C., a temperature of the ninth barrel to the twelfth barrel was set to be 180° C., a temperature of the adaptor and the coat-hanger die was set to be 160° C. and a number of rotation of the screw was set to be 40 rpm.

Random type polypropylene (manufactured by Japan Polychem Corporation, trade name "EG8", melt index=0.8 g/10 minutes, density= 0.9 g/cm$^3$) and p-quinone dioxime as a multifunctional monomer (manufactured by Ouchishinko Chemical Co. Ltd., trade name "VALNOC GM-P") were fed to the hopper, which is provided to be integrated at the rear end of the first barrel of the above-mentioned first extruder, and were melted and kneaded to manufacture the modified polypropylene, and the obtained modified polypropylene was continuously fed to the second extruder through the adaptor. In the meantime, the amount of feed of the above-mentioned polypropylene was 10 kg/h, and the amount of feed of the p-quinone dioxime was 0.08 kg/h.

Further, pellets of the modified polypropylene, which were obtained in a manner as will be described hereinafter, and unmodified homopolypropylene (manufactured by Japan Polychem Corporation, trade name "MA3", melt index=10 g/minute, density=0.91 g/cm$^3$) were fed from the hopper which is provided at the rear end of the first barrel of the second extruder, and azodicarbonamide was fed from the side feeder which is provided at the sixth barrel of the second extruder. Then, after the modified polypropylene, which was continuously fed from the above-mentioned first extruder, pellets of the modified polypropylene, unmodified homopolypropylene and azodicarbonamide were melted and kneaded, expandable polypropylene sheet of 0.4 mm thick was obtained from the coat hanger die provided at the tip of the second extruder. The amount of feed of the modified polypropylene was 10 kg/h, the amount of feed of unmodified polypropylene was 10 kg/h, and the amount of feed of azodicarbonamide was 2 kg/h.

The pellets of the modified polypropylene fed from the hopper of the first barrel of the second extruder were made in a manner as follows. Namely, instead of using the adaptor which was used in the above-mentioned method to connect the second extruder to the tip of the first extruder, the one which was provided with a three-hole strand die was used. The random type polypropylene (manufactured by Japan Polychem Corporation, melt index= 0.8 g/10 minutes, density=0.9 g/cm$^3$) and p-quinone dioxime (manufactured by Ouchishinko Chemical Co. Ltd., trade name "VALNOC GM-P") as a multifunctional monomer were fed to the hopper provided to be integrated at the rear end of the first barrel of the extruder and were melted and kneaded. Then after the modified polypropylene was extruded from the three-hole strand die, the extruded modified polypropylene was cooled with water, and was cut with a pelletizer into a predetermined length to obtain the modified polypropylene in a state of pellet. An amount of supply of the above-mentioned polypropylene was 10 kg/h, and an amount of the p-quinone dioxime was 0.08 kg/h.

In the meantime, in order to provide a laminated surface material, a surface film comprising homo-type polypropylene (Tokuyama Co., Ltd., trade name "SH-152", melt index=15 g/minute, density=0.91 g/cm$^3$) film of 1500 mm wide and 70 μm thick was layered on and integrated with, by way of heat-lamination, one side of the sheet for reinforcement (width=1500 mm, per-unit weight=43 g/m$^2$, coefficient of linear expansion=–0.1×10$^{-5}$/° C., carbon fibers/polypropylene fibers (weight ratio)=70/30) in a state of a continuous sheet, which sheet for reinforcement comprises carbon fibers (carbon fiber diameter=7 μm, fiber length=50 mm) and polypropylene fibers (melt index=30 g/10 minutes) interwound with one another.

Figure 2:
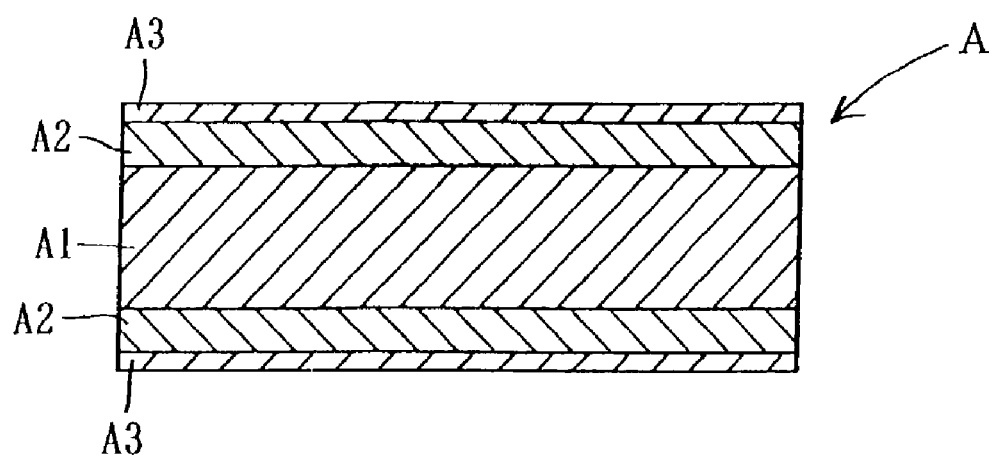
FIG. 2 shows a longitudinal sectional view of the multi-layer sheet.

And the above-mentioned laminated surface material was layered on both surfaces of the above-mentioned expandable polypropylene sheet in a manner that the sheet for reinforcement comes inside in order to provide an expandable multi-layer sheet. Then the expandable multi-layer sheet was fed to a belt-type heating apparatus and was heated to 230° C. in order to foam the expandable polypropylene sheet. By pressing the above-mentioned laminated surface material against each of both surfaces of thermoplastic resin foam sheet provided by foaming the expandable polypropylene sheet, the former and the latter were integrated with each other, and were cooled to provide a multi-layer sheet of 6.5 mm thick comprising a reinforcing sheet and a surface layer which were so layered on and integrated with both surfaces of a polypropylene foam sheet that each of the reinforcing sheet came inside. (See FIG. 2.)

The reinforcing sheet (A2) of the obtained multi-layer sheet (A) was firmly layered on and integrated with both surfaces of the polypropylene foam sheet (A1). And the carbon fibers comprising the above-mentioned reinforcing sheet (A2) were firmly bound together having polypropylene, being melted polypropylene fibers, as a binder. The carbon fibers were in a state of being covered and concealed with the above-mentioned surface layer (A3), and each surface of the multi-layer sheet (A) was formed to be a smooth surface. In addition, the homo-type polypropylene comprising the surface layer (A3) of the multi-layer sheet (A) entered into the reinforcing sheet (A2) to reach the surface of the polypropylene foam sheet (A1) and was firmly integrated with the polypropylene foam sheet (A1).

Figure 3:
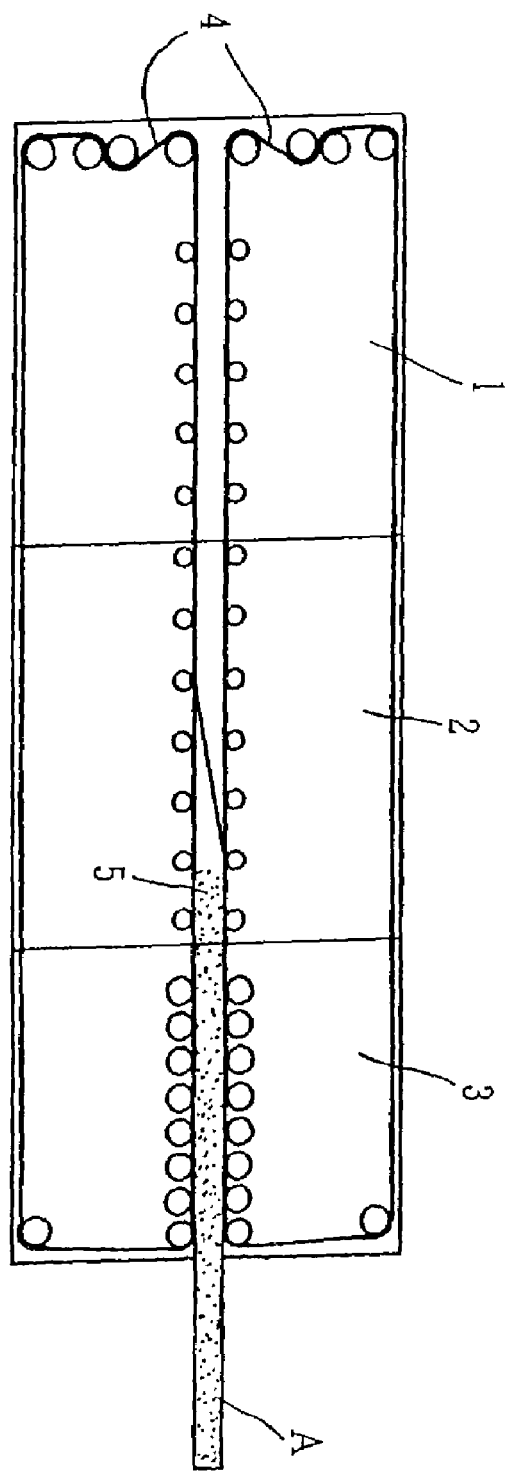
FIG. 3 is a model side view showing a belt-type heating apparatus used when the multi-layer sheet is manufactured.

Further, as shown in FIG. 3, the above-mentioned belt-type heating apparatus comprises a preheating zone 1, a foaming zone 2, a cooling zone 3, and a pair of conveyer belts 4, 4 which are arranged extendedly over these three zones leaving a predetermined clearance in an up-and-down direction. The expandable multi-layer sheet was placed on the upper surface of the lower conveyer belt of the pair of the conveyer belts 4,4 and the expandable multi-layer sheet was sent into the preheating zone 1, the foaming zone 2 and the cooling zone 3 in this order. Then the above-mentioned expandable multi-layer sheet was foamed between inner surfaces of the conveyer belts 4, 4 facing to each other, and while foaming of the above-mentioned expandable multi-layer sheet 5 was in progress, the expandable multi-layer sheet 5 was held and pressed from up-and-down directions between the inner surfaces of the conveyer belts 4, 4 facing to each other in order to press the sheet for reinforcement against each of both sides of the expandable polypropylene sheet to be integrated therewith. In this manner, the multi-layer sheet was obtained in which the reinforcing sheet and the surface layer were layered on each of both sides of the polypropylene foam sheet in this order. A temperature of the preheating zone was set to be 190° C., a temperature of the foaming zone was set to be 230° C., and a temperature of the cooling zone was set to be 25° C., and a linear velocity of supply of the expandable polypropylene sheet into the belt-type heating apparatus was set to be 0.5 m/minute.

Embodiment 2

The multi-layer sheet was obtained in a similar manner as in the embodiment 1 except that as the sheet for reinforcement, the sheet for reinforcement in a state of a continuous sheet (width=1500 mm, per-unit weight=43 g/m$^2$, coefficient of linear expansion=0.2×10$^{-5}$/° C., glass fiber/polypropylene fiber (weight ratio)=70/30) was used which comprises glass fibers (glass fiber diameter=9 μm, glass fiber length=50 mm) and polypropylene fibers (melt index=30 g/10 minutes) interwound with one another.

The reinforcing sheet (A2) of the obtained multi-layer sheet (A) was firmly layered on and integrated with each of both sides of the polypropylene foam sheet (A1). And the glass fibers comprising the above-mentioned reinforcing sheet (A2) were firmly bound together with polypropylene, being melted polypropylene fibers, as a binder. In addition, the glass fibers were in a state of being covered and concealed with the above-mentioned surface layer (A3) and both surfaces of the multi-layer sheet (A) were formed to be smooth surfaces. The homo-type polypropylene comprising the surface layer (A3) of the above-mentioned multi-layer sheet (A) entered into the reinforcing sheet (A2) and reached the surface of the above-mentioned polypropylene foam sheet (A1) and was firmly integrated with the polypropylene foam sheet (A1).

Embodiment 3

The multi-layer sheet was obtained in a similar manner as in the embodiment 1 except that as the sheet for reinforcement, the sheet for reinforcement in a state of a continuous sheet (width=1500 mm, per-unit weight=43 g/m$^2$, coefficient of linear expansion=0.2×10$^{-5}$/° C., kenaf fiber/polypropylene fiber (weight ratio)=70/30) was used, which comprises kenaf fibers (kenaf fiber diameter=9 μm, kenaf fiber length=50 mm) and polypropylene fibers (melt index=30 g/10 minutes) interwound with one another.

The reinforcing sheet (A2) of the obtained multi-layer sheet (A) was firmly layered on and integrated with each of both sides of the polypropylene foam sheet (A1). And the kenaf fibers comprising the reinforcing sheet (A2) were firmly bound together with polypropylene, being melted polypropylene fibers, as a binder. In addition, the kenaf fibers were in a state of being covered and concealed with the above-mentioned surface layer (A3) and both surfaces of the multi-layer sheet (A) were formed to be smooth surfaces. Further, the homo-type polypropylene comprising the surface layer (A3) of the above-mentioned multi-layer sheet (A) entered into the reinforcing sheet (A2) and reached the surface of the above-mentioned polypropylene foam sheet (A1) and was firmly integrated with the polypropylene foam sheet (A1).

Embodiment 4

The multi-layer sheet was obtained in a similar manner as in the embodiment 1 except that as the surface film, non-woven fabric of per-unit weight of 25 g/m$^2$ was used which comprises core-sheath type fibers interwound with one another. The core-sheath type fiber comprises polyester as a core and polyethylene as a sheath.

The reinforcing sheet (A2) of the obtained multi-layer sheet (A) was firmly layered on and integrated with each of both sides of the polypropylene foam sheet (A1). And the carbon fibers comprising the reinforcing sheet (A2) were firmly bound together with polypropylene, being melted polypropylene fibers, as a binder. In addition, the carbon fibers were in a state of being covered and concealed with the above-mentioned surface layer (A3) and both surfaces of the multi-layer sheet (A) were formed to be smooth surfaces. In the meantime, the above-mentioned core-sheath type fibers were melted and shape and state of the fibers completely disappeared to form the smooth surface layer (A3). The homo-type polypropylene comprising the surface layer (A3) of the above-mentioned multi-layer sheet (A) entered into the reinforcing sheet (A2) and reached the surface of the above-mentioned polypropylene foam sheet (A1) and was firmly integrated with the polypropylene foam sheet (A1).

Embodiment 5

The multi-layer sheet was obtained in a similar manner as in the embodiment 1 except that glass paper (manufactured by Olibest Co., Ltd., trade name "Glabest", per-unit weight=35 g/m$^2$, a coefficient of liner expansion=0.2×10$^{-5}$/° C., thickness=0.3 mm, glass fiber diameter=9 μm, glass fiber length=25 mm binder=acrylate-based emulsion resin, content of glass fiber=85 weight %) in a state of sheet was used as a sheet for reinforcement, and that a thickness of the surface film was made to be 80 μm.

The reinforcing sheet (A2) of the obtained multi-layer sheet (A) was firmly layered on and integrated with each of both sides of the polypropylene foam sheet (A1). And the glass fibers comprising the reinforcing sheet (A2) were firmly bound together with the acrylate-based emulsion resin as a binder. In addition, the glass fibers were in a state of being covered and concealed with the above-mentioned surface layer (A3) and both surfaces of the multi-layer sheet (A) were formed to be smooth surfaces. Further, the homo-type polypropylene comprising the surface layer (A3) of the above-mentioned multi-layer sheet (A) entered into the reinforcing sheet (A2) and reached the surface of the above-mentioned polypropylene foam sheet (A1) and was firmly integrated with the polypropylene foam sheet (A1).

Embodiment 6

The multi-layer sheet was obtained in a similar manner as in the embodiment 1 except that carbon fiber paper (manufactured by Olibest Co., Ltd., trade name "Carbolight", per-unit weight=35 g/m$^2$, coefficient of liner expansion=−1.0×10$^{-5}$/C, thickness=0.3 mm, carbon fiber diameter=7 μm, carbon fiber length=25 mm, binder=acrylate-based emulsion resin, content of carbon fiber=85 weight %) in a state of sheet was used as the sheet for reinforcement, and that a thickness of the surface film was made to be 80 μm.

The reinforcing sheet of the obtained multi-layer sheet was firmly layered on and integrated with each of both sides of the polypropylene foam sheet. And the carbon fibers comprising the reinforcing sheet were firmly bound together with the acrylate-based emulsion resin as a binder. In addition, the carbon fibers were in a state of being covered and concealed with the above-mentioned surface layer and both surfaces of the multi-layer sheet were formed to be smooth surfaces. Further, the homo-type polypropylene comprising the surface layer of the above-mentioned multi-layer sheet entered into the reinforcing sheet and reached the surface of the above-mentioned polypropylene foam sheet and was firmly integrated with the polypropylene foam sheet.

Embodiment 7

The multi-layer sheet was obtained in a similar manner as in the embodiment 1 except that kenaf paper (manufactured by Olibest Co., Ltd., per-unit weight=35 g/m$^2$, coefficient of liner expansion=0.4×10$^{-5}$/° C., thickness=0.3 mm, kenaf fiber diameter=80 μm, kenaf fiber length=25 mm, binder=mixture of 70 weight % of polyvinyl alcohol and 30 weight % of thermoplastic urethane resin, content of kenaf fiber=85 weight %) in a state of sheet was used as the sheet for reinforcement, and that a thickness of the surface film was made to be 80 μm.

The reinforcing sheet (A2) of the obtained multi-layer sheet (A) was firmly layered on and integrated with each of both sides of the polypropylene foam sheet (A1). And the kenaf fibers comprising the above-mentioned reinforcing sheet (A2) were firmly bound together with the polyvinyl alcohol and the thermoplastic urethane resin as a binder. In addition, the kenaf fibers were in a state of being covered and concealed with the above-mentioned surface layer (A3) and both surfaces of the multi-layer sheet (A) were formed to be smooth surfaces. The homo-type polypropylene comprising the surface layer (A3) of the above-mentioned multi-layer sheet (A) entered into the reinforcing sheet (A2), reached the surface of the above-mentioned polypropylene foam sheet (A1) and was firmly integrated with the polypropylene foam sheet (A1).

Embodiment 8

An extruder used in the embodiment 1 was used to which a T die of 1600 mm wide was attached instead of the adaptor for connecting the second extruder to the tip of the first extruder. 50 weight parts of random type polypropylene (manufactured by Japan Polychem Corporation, trade name "EG8", melt index=0.8 g/10 minutes, density=0.9 g/cm$^3$), 50 weight parts of homo-type polypropylene (manufactured by Japan Polychem Corporation, trade name "MA3", melt index=10 g/10 minutes, density=0.9 μg/cm$^3$), 1.0 weight parts of 1,9-nonanedioldimethacrylate as a crosslinking agent, 10 weight parts of azodicarbonamide as a pyrolysis-type foaming agent, 0.1 weight parts of 2,6-di-t-butyl-p-crezol and 0.1 weight parts of dilauryl thiodipropionate as antioxidants, and 0.2 weight parts of methylbenzotriazol as a metal deactivator were fed to the hopper mounted to be integrated with the rear end of the first barrel of the extruder and were melted and kneaded at 190° C., and the expandable polypropylene sheet of 0.4 mm thick was provided by way of extrusion molding.

Electron beam of 2 Mrad was applied to the obtained expandable polypropylene sheet at an acceleration voltage of 600 kV in order to provide a crosslinking structure. In the meantime, gel fraction of the expandable polypropylene sheet was 20 weight %.

On the other hand, a laminated surface material was obtained by having a surface film, comprising homo-type polypropylene (manufactured by Tokuyama Co. Ltd., trade name "SH-152", melt index=15 g/minute, density= 0.91 g/cm$^3$) film of 1500 mm wide and 70 μm thick, layered on and integrated with, by way of heat laminating, one side of a sheet for reinforcement (width 1500 mm, per-unit weight=43 g/m$^2$, coefficient of linear expansion=−1.0×10$^{-5}$/° C., carbon fibers/polypropylene fibers (weight ratio)=70/30) in a state of continuous sheet comprising carbon fibers (carbon fiber diameter=7 μm, fiber length=50 mm) and polypropylene fibers (melt index=30 g/10 minutes) interwound with one another.

Then, the expandable multi-layer sheet, which was obtained by layering the above-mentioned laminated surface material on each of both surfaces of the above-mentioned expandable polypropylene sheet in a manner that the sheet for reinforcement came inside, was fed into the belt-type heating apparatus and was heated to 230° C. in order to foam the expandable polypropylene sheet, and by having the above-mentioned laminated surface material pressed against each of both surfaces of the thermoplastic resin foam sheet, which was obtained by foaming the expandable polypropylene sheet, the former and the latter were integrated, which were then cooled in order to obtain the multi-layer sheet of 6.5 mm thick comprising the reinforcing sheet and the surface layer layered on and integrated with the each of the both surfaces of the polypropylene foam sheet in this order in a manner that the reinforcing sheet came inside.

The reinforcing sheet (A1) of the obtained multi-layer sheet (A) was firmly layered on and integrated with each of both surfaces of the polypropylene foam sheet. The carbon fibers comprising the above-mentioned reinforcing sheet (A2) were firmly bound together with polypropylene, being melted polypropylene fibers, as a binder. In addition, the carbon fibers are in a state of being covered and concealed with the above-mentioned surface layer (A3) and both surfaces of the multi-layer sheet (A) were formed to be smooth surfaces. Further, the homo-type polypropylene comprising the surface layer (A3) of the above-mentioned multi-layer sheet (A) entered into the reinforcing sheet (A2), reached the surface of the above-mentioned polypropylene foam sheet (A1) and was firmly integrated with the polypropylene foam sheet (A1).

Furthermore, as shown in FIG. 3, the above-mentioned belt-type heating apparatus comprises the preheating zone 1, the foaming zone 2, the cooling zone 3, and the pair of conveyer belts 4, 4 which are arranged extendedly over the three zones leaving a predetermined clearance in a up-and-down direction. The expandable multi-layer sheet was placed on the upper surface of the lower conveyer belt of the pair of the conveyer belts 4,4, and was sent into the preheating zone 1, the foaming zone 2 and the cooling zone 3 in this order, so that the above-mentioned expandable multi-layer sheet was able to be foamed between the inner surfaces of the conveyer belts 4, 4 facing to each other, and while foaming of the above-mentioned expandable multi-layer sheet 5 was in progress, the expandable multi-layer sheet 5 was held and pressed from up-and-down directions between the inner surfaces of the conveyer belts 4, 4 facing to each other in order to press the sheet for reinforcement toward each of both sides of the expandable polypropylene sheet to make the former and the latter integrated together. In a manner as above-mentioned, the multi-layer sheet was obtained in which the reinforcing sheet and the surface layer were layered in this order on each of both sides of the polypropylene foam sheet. A temperature of the preheating zone was set to be 190° C., a temperature of the foaming zone was set to be 230° C., and a temperature of the cooling zone was set to be 25° C., and a linear velocity of feed of the expandable polypropylene sheet into the belt-type heating apparatus was set to be 0.5 m/minute.

Embodiment 9

The multi-layer sheet was obtained in a similar manner as in the embodiment 8 except that as the sheet for reinforcement, the sheet for reinforcement in a state of continuous sheet (width=1500 mm, per-unit weight=43 g/m$^2$, coefficient of linear expansion=0.2×10 5/C , glass fiber/polypropylene fiber (weight ratio)=70/30) was used, which sheet for reinforcement comprises glass fibers (glass fiber diameter=9 μm, glass fiber length=50 mm) and polypropylene fibers (melt index=30 g/10 minutes) interwound with one another.

The reinforcing sheet (A2) of the obtained multi-layer sheet (A) was firmly layered on and integrated with each of both sides of the polypropylene foam sheet (A1). And the glass fibers comprising the reinforcing sheet (A2) were firmly bound together with polypropylene, being melted polypropylene fibers, as a binder. In addition, the glass fibers were in a state of being covered and concealed with the above-mentioned surface layer and both surfaces of the multi-layer sheet (A) were formed to be smooth surfaces. Further, the homo-type polypropylene comprising the surface layer of the above-mentioned multi-layer sheet (A) entered into the reinforcing sheet (A2), reached the surface of the above-mentioned polypropylene foam sheet (A1) and was firmly integrated with the polypropylene foam sheet (A1).

Embodiment 10

The multi-layer sheet was obtained in a similar manner as in the embodiment 8 except that as the sheet for reinforcement, the sheet for reinforcement in a state of continuous sheet (width=1500 mm, per-unit weight 42 g/m$^2$, coefficient of linear expansion 0.2×10$^{-5}$/° C., kenaf fiber/polypropylene fiber (weight ratio)=70/30) was used, which sheet for reinforcement comprises kenaf fibers (kenaf fiber diameter=9 μm, kenaf fiber length=50 mm) and polypropylene fibers (melt index=30 g/10 minutes) interwound with one another.

The reinforcing sheet (A2) of the obtained multi-layer sheet (A) was firmly layered on and integrated with each of both sides of the polypropylene foam sheet (A1). And the kenaf fibers comprising the reinforcing sheet (A2) were firmly bound together with polypropylene, being melted polypropylene fibers, as a binder. In addition, the kenaf fibers were in a state of being covered and concealed with the above-mentioned surface layer and both surfaces of the multi-layer sheet (A) were formed to be smooth surfaces. Further, the homo-type polypropylene comprising the surface layer of the above-mentioned multi-layer sheet (A) entered into the reinforcing sheet (A2), reached the surface of the above-mentioned polypropylene foam sheet (A1) and was firmly integrated with the polypropylene foam sheet (A1).

Embodiment 11

The multi-layer sheet was obtained in a similar manner as in the embodiment 8 except that as the surface film, the non-woven fabric, whose per-unit weight was 25 g/m$^2$, was used, which non-woven fabric comprises core-sheath type fibers interwound with one another, and which core-sheath type fiber comprises polyester as a core and polyethylene as a sheath.

The reinforcing sheet (A2) of the obtained multi-layer sheet (A) was firmly layered on and integrated with each of both sides of the polypropylene foam sheet (A1). And the carbon fibers comprising the reinforcing sheet (A2) were firmly bound together with polypropylene, being melted polypropylene fibers, as a binder. In addition, the carbon fibers were in a state of being covered and concealed with the above-mentioned surface layer (A3) and both surfaces of the multi-layer sheet (A) were formed to be smooth surfaces. In the meantime, the core-sheath type fibers were melted and shape and state of fibers completely disappeared to form a smooth surface layer (A3). Further, the homo-type polypropylene comprising the surface layer of the above-mentioned multi-layer sheet (A) entered into the reinforcing sheet (A2), reached the surface of the above-mentioned polypropylene foam sheet (A1) and was firmly integrated with the polypropylene foam sheet (A1).

Embodiment 12

The multi-layer sheet was obtained in a similar manner as in the embodiment 8 except that glass paper (manufactured by Olibest Co., Ltd., trade name "Glabest", per-unit weight=35 g/m$^2$, coefficient of liner expansion= 0.2×10$^{-5}$/° C., thickness=0.3 mm, glass fiber diameter=9 μm, glass fiber length=25 mm binder=acrylate-based emulsion resin, content of glass fiber= 85 weight %) in a state of sheet was used as the sheet for reinforcement, and that a thickness of the surface film was made to be 80 μm.

The reinforcing sheet (A2) of the obtained multi-layer sheet (A) was firmly layered on and integrated with each of both sides of the polypropylene foam sheet (A1). And the glass fibers comprising the reinforcing sheet (A2) were firmly bound together with the acrylate-based emulsion resin as a binder. In addition, the glass fibers were in a state of being covered and concealed with the above-mentioned surface layer and both surfaces of the multi-layer sheet (A) were formed to be smooth surfaces. The homo-type polypropylene comprising the surface layer of the above-mentioned multi-layer sheet (A) entered into the reinforcing sheet (A2), reached the surface of the above-mentioned polypropylene foam sheet (A1) and was firmly integrated with the polypropylene foam sheet (A1).

Embodiment 13

The multi-layer sheet was obtained in a similar manner as in the embodiment 8 except that carbon fiber paper (manufactured by Olibest Co., Ltd., trade name "Carbolight", per-unit weight=35 g/m$^2$, coefficient of liner expansion=−1.0×10 5/C, thickness=0.3 mm, carbon fiber diameter=7 μm, carbon fiber length=25 mm, binder=acrylate-based emulsion resin, content of carbon fiber=85 weight %) in a state of sheet was used as the sheet for reinforcement, and that a thickness of the surface film was made to be 80 μm.

The reinforcing sheet (A2) of the obtained multi-layer sheet (A) was firmly layered on and integrated with each of both sides of the polypropylene foam sheet (A1). And the carbon fibers comprising the reinforcing sheet (A2) were firmly bound together with the acrylate-based emulsion resin as a binder. In addition, the carbon fibers were in a state of being covered and concealed with the above-mentioned surface layer and both surfaces of the multi-layer sheet (A) were formed to be smooth surfaces. Further, the homo-type polypropylene comprising the surface layer of the above-mentioned multi-layer sheet (A) entered into the reinforcing sheet (A2), reached the surface of the above-mentioned polypropylene foam sheet (A1) and was firmly integrated with the polypropylene foam sheet (A1).

Embodiment 14

The multi-layer sheet was obtained in a similar manner as in the embodiment 8 except that kenaf paper (manufactured by Olibest Co., Ltd., per-unit weight=35 g/m², coefficient of liner expansion=0.4×10⁻⁵/° C. thickness=0.3 mm, kenaf fiber diameter=80 μm, kenaf fiber length=25 mm, binder=mixture of 70 weight % of polyvinyl alcohol and 30 weight % of thermoplastic urethane resin, content of kenaf fiber=85 weight %) in a state of sheet was used as the sheet for reinforcement, and that a thickness of the surface film was made to be 80 μm.

The reinforcing sheet (A2) of the obtained multi-layer sheet (A) was firmly layered on and integrated with each of both sides of the polypropylene foam sheet (A1). And the kenaf fibers comprising the reinforcing sheet (A2) were firmly bound together with the polyvinyl alcohol and the thermoplastic urethane resin as a binder. In addition, the kenaf fibers were in a state of being covered and concealed with the above-mentioned surface layer and both surfaces of the multi-layer sheet (A) were formed to be smooth surfaces. Further, the homo-type polypropylene comprising the surface layer of the above-mentioned multi-layer sheet (A) entered into the reinforcing sheet (A2), reached the surface of the above-mentioned polypropylene foam sheet (A1) and was firmly integrated with the polypropylene foam sheet (A1).

EXAMPLE FOR COMPARISON 1

After the sheet for reinforcement comprising kenaf paper (manufactured by Olibest Co., Ltd., per-unit weight=35 g/m², coefficient of linear expansion=0.4×10⁻⁵/° C., thickness=0.3 mm, kenaf fiber diameter=80 ft m, kenaf fiber length=25 mm, binder=mixture of 70 weight % of polyvinyl alcohol and 30 weight % of thermoplastic urethane resin, content of kenaf fiber=85 weight %) in a state of sheet was layered on each of both surfaces of a crosslinked polypropylene foam sheet (manufactured by Sekisui Kagaku Kogyo Kabushiki Kaisha, trade name "Softron SP", expansion ratio=15 cc/g), with an aspect ratio Dz/Dxy of bubbles being 1 and with a thickness of 6.0 mm, the crosslinked polypropylene foam sheet was molded by heat from both surfaces thereof in order to provide a multi-layer sheet whose weight is 600 g/m² and whose thickness is 6.5 mm.

Per-unit strength, coefficient of linear expansion and handling efficiency of each multi-layer sheet obtained in the embodiments 1 to 14 and the example for comparison 1, an expansion ratio and an aspect ratio of each thermoplastic resin foam sheet of each multi-layer sheet, and a per-unit weight of each reinforcing sheet of each multi-layer sheet and a content of non-meltable fibers of each reinforcing sheet were determined in manners as mentioned below, and the results thereof are shown in Tables 1 and 2.

(Per-Unit Strength)

A piece of specimen of 15 cm long×50 cm wide×6.5 cm high was cut out of the multi-layer sheet. Then a bending elasticity slope X (N/50 mm/cm) was determined according to Japanese Industrial Standard K7203, and on the other hand, a per-unit weight Y (kg/m²) of the multi-layer sheet was determined and the per-unit strength was determined according to the following formula.

Per-Unit Strength $(N/50 \text{ mm/cm/kg/m}^2)=X/Y$ (Coefficient of Linear Expansion)

A piece of specimen of 15 cm long×2 cm wide X6.5 cm high was cut out of the multi-layer sheet and was heated for 24 hours in an atmosphere of 85° C. After that, marked lines were put on the surface of the specimen at intervals of 130 mm. Next, the specimen was left in a thermostat of 80° C. for 6 hours, and the specimen was taken out, and lengths ($L_{80}$) between the adjacent marked lines were determined immediately. Further, after the above-mentioned specimen was left in a thermostat of 0° C. for 6 hours the specimen was taken out, and lengths ($L_0$) between the above-mentioned marked lines were determined immediately. Then the coefficient of linear expansion was calculated according to the following formula.

Coefficient of Linear Expansion $(1/° \text{ C.})=(L_0-L_{80})/(L_0 \times 80)$ (Moldability)

Figure 4:
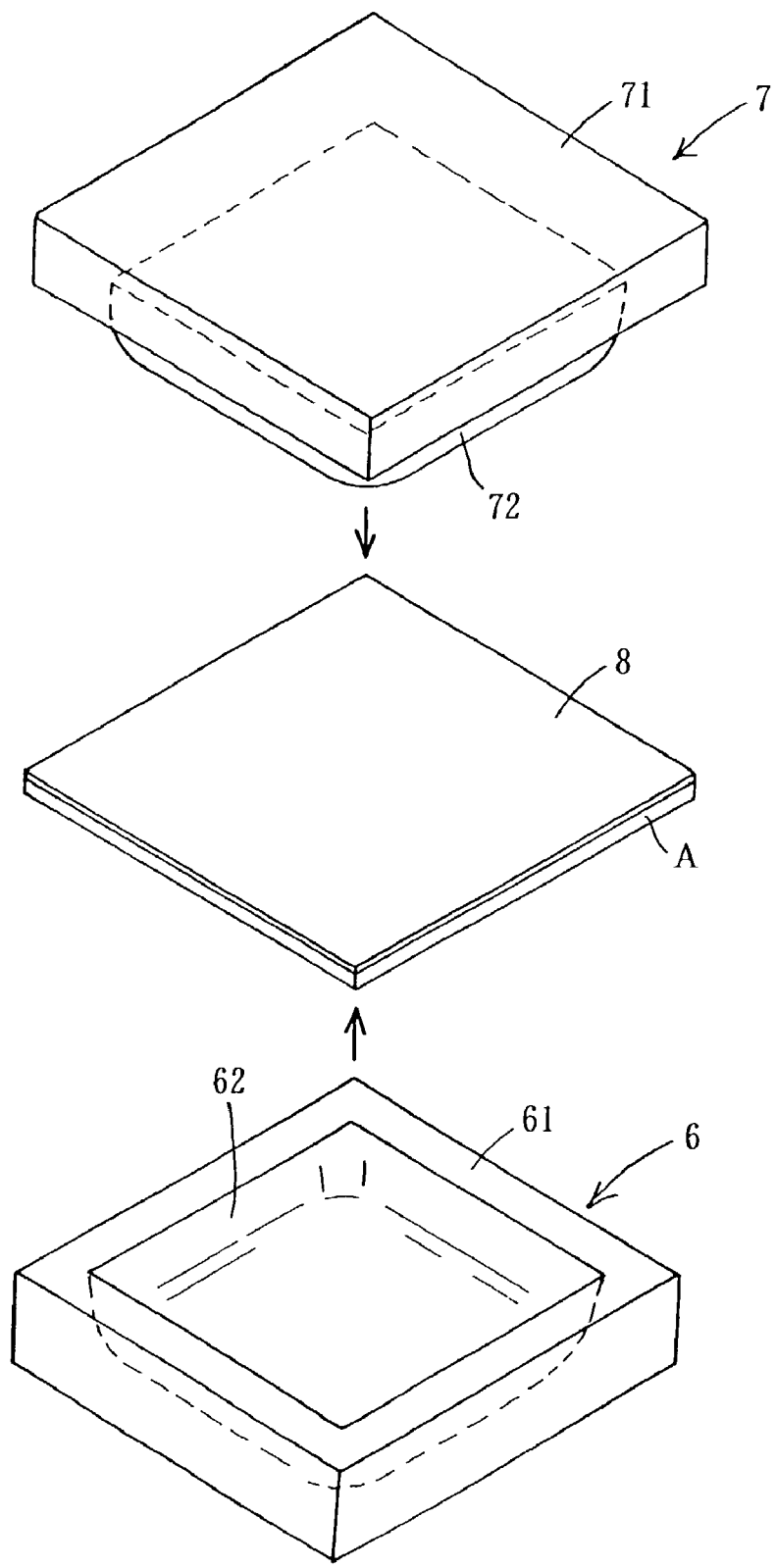
FIG. 4 is a perspective view showing a male-female metal mold which is used when the multi-layer sheet is molded.

The multi-layer sheet was formed by using the male-female metal mold as shown in FIG. 4. To be specific, the female-type metal mold 6 comprises a plane-square-shaped female-type metal mold main body 61 in a center of an upper side of which a truncated-right-pyramid-shaped concavity 62 of 1500 mm long×1200 mm wide×300 mm deep is formed. Both of each ridge and each edge of an opening of the concavity 62 are chamfered to form a circular arc. On the other hand, in a male-type metal mold 7, a male-type metal mold main body 71 is formed to be plane square-shaped whose shape and size are the same as the above-mentioned female-type metal mold main body 62 of the female-type metal mold 6, and a truncated-right-pyramid-shaped convexity 72, which can fit the concavity 62 of the female-type metal mold 6, is formed to project in a center of a lower side of the male-type metal mold main body 71.

Figure 5:
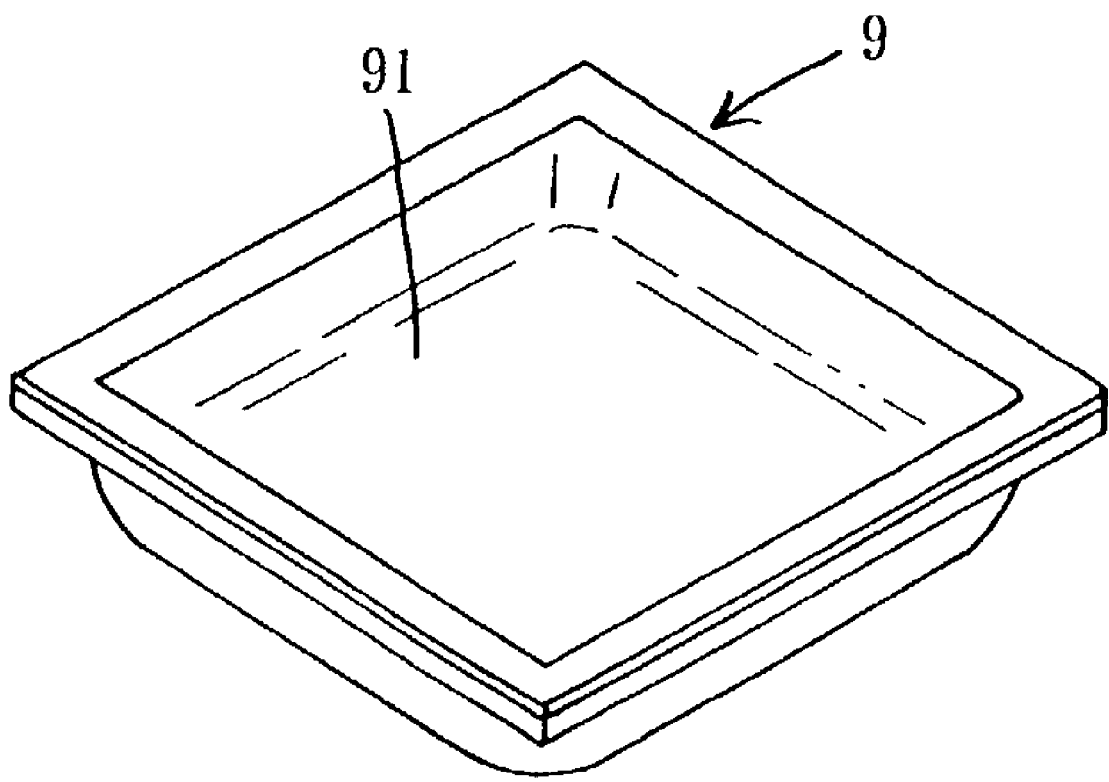
FIG. 5 is a perspective view showing the molding product provided by using the male-female metal mold shown in FIG. 4.

Polyester non-woven fabric 8 with a per-unit weight of 200 g/m² was placed on an upper surface of the multi-layer sheet (A), the multi-layer sheet (A) was heated until a surface temperature of the multi-layer sheet (A) became 180° C. and was arranged between the above-mentioned female-type metal mold 6 and the male-type metal mold 7. Next, the female-type metal mold 6 and the male-type metal mold 7 are clamped with a clearance of 5 mm and the multi-layer sheet (A) was formed in-between under pressure in order to provide a molding product 9 in a shape as shown in FIG. 5. In the meantime, the female-type metal mold 6 and the male-type metal mold 7 are regulated to be 40° C., and time for clamping of the female-type metal mold 6 and the male-type metal mold 7 was 30 seconds. Further, after the female-type metal mold 6 and the male-type metal mold 7 were opened, the obtained molding product 9 was trimmed.

Each of the obtained molding products was visually observed. The molding product with neither crinkle nor crack on a surface thereof was marked ⊚, the one with a little crinkles and cracks was marked ○, and the one with a lot of crinkles and cracks was marked X.

(Handling Efficiency of Molding Products)

After sticking an iron plumb bob of 500 g on a center part of the concavity 91 of the molding product 9, which was obtained in the above-mentioned manner, the molding product 9 was placed on a flat floor surface, was lifted upward to a predetermined height by holding center portions of rims of four sides of the molding product, and was placed on the floor surface again. This action was repeated 10 times and the one without any crinkle, dent and fold was marked ○, the one with at least one of crinkle, dent and fold on at least a part was marked X.

(Expansion Ratio)

Expansion ratio was determined according to Japanese Industrial Standard K6767.

(Aspect Ratio)

A polypropylene foam sheet of the multi-layer sheet was cut in a direction of a thickness thereof, and an enlarged picture by 20 times of a center part of a section thereof was taken with an optical microscope. With regard to the bubbles shown in the picture, an aspect ratio (Dz/Dxy) of each bubble, which was an object of determination, was determined, and a mean value was calculated. In the meantime, the bubbles with a life-size (Dz) of less than 0.1 mm and the bubbles with the life-size (Dz) exceeding 2 mm were not made to be objects of determination.

reinforcing sheet became exposed. A unit-weight of each reinforcing sheet obtained in this manner was determined, a mean value of the numbers was calculated to determine the per-unit weight of the reinforcing sheet.

(Content of Non-Meltable Fibers in a Reinforcing Sheet)

At first, a weight of each reinforcing sheet, which was obtained in the above-mentioned manner to determine the per-unit weight, was determined. Next, the reinforcing sheet was immersed in xylene of 120° C. for 24 hours and was filtered with a 200-mesh stainless wire gauze, and then non-meltable fiber left on the wire gauze after filtering were vacuum-dried. Then, the vacuum-dried non-meltable fiber was weighed in order to calculate the content of the non-meltable fibers in the reinforcing sheet in accordance with the following formula, and a mean value of the numbers was made to be the content of the non-meltable fibers in the reinforcing sheet.

Content of Non-Meltable Fibers in Reinforcing Sheet (weight %)= 100×Weight of Non-Meltable Fibers/Weight of Reinforcing Sheet before being Immersed in Xylene

TABLE 1

|  | Embodiment 1 | Embodiment 2 | Embodiment 3 | Embodiment 4 | Embodiment 5 | Embodiment 6 | Embodiment 7 |
| --- | --- | --- | --- | --- | --- | --- | --- |
| Per-Unit Strength (N/50 mm/cm/kg/m$^2$) | 288.12 | 225.4 | 205.6 | 279.3 | 176.4 | 227.36 | 142.1 |
| Coefficient of Linear Expansion (×10$^{-5}$/° C.) | 1.5 | 2.3 | 1.8 | 1.4 | 2.4 | 1.5 | 2.3 |
| Moldability | ⊚ | ⊚ | ⊚ | ⊚ | ○ | ○ | ○ |
| Handling Efficiency of Molding Product | ○ | ○ | ○ | ○ | ○ | ○ | ○ |
| Expansion Ratio (cc/g) | 15 | 15 | 15 | 15 | 15 | 15 | 15 |
| Aspect Ratio (Dz/Dxy) | 1.8 | 1.9 | 1.8 | 1.7 | 1.7 | 1.7 | 1.8 |
| Per-Unit Weight of Reinforcing Sheet (g/m$^2$) | 55.6 | 55.2 | 55.8 | 55.0 | 55.3 | 55.4 | 56.0 |
| Content of Non-Meltable Fibers (weight %) | 54.0 | 53.8 | 54.0 | 54.0 | 54.0 | 53.8 | 54.0 |

TABLE 2

|  | Embodiment 8 | Embodiment 9 | Embodiment 10 | Embodiment 11 | Embodiment 12 | Embodiment 13 | Embodiment 14 | Example for Comparison 1 |
| --- | --- | --- | --- | --- | --- | --- | --- | --- |
| Per-Unit Strength (N/50 mm/cm/kg/m$^2$) | 283.22 | 220.5 | 210.5 | 289.1 | 181.3 | 219.52 | 151.9 | 88.2 |
| Coefficient of Linear Expansion (×10$^{-5}$/° C.) | 1.5 | 2.4 | 1.8 | 1.4 | 2.4 | 1.6 | 2.2 | 2.3 |
| Moldability | ⊚ | ⊚ | ⊚ | ⊚ | ○ | ○ | ○ | ○ |
| Handling Efficiency of Molding Product | ○ | ○ | ○ | ○ | ○ | ○ | ○ | X |
| Expansion Ratio (cc/g) | 15 | 15 | 15 | 15 | 15 | 15 | 15 | 15 |
| Aspect Ratio (Dz/Dxy) | 1.8 | 1.8 | 1.8 | 1.7 | 1.8 | 1.7 | 1.7 | 1.0 |
| Per-Unit Weight of Reinforcing Sheet (g/m$^2$) | 55.5 | 55.4 | 55.0 | 55.8 | 56.0 | 56.2 | 56.0 | 55.6 |
| Content of Non-Meltable Fibers (weight %) | 54.0 | 53.8 | 54.2 | 53.8 | 54.3 | 54.0 | 54.2 | 53.8 |

(Per-Unit Weight of Reinforcing Sheet)

A specimen of 2 cm wide×5 cm long was cut out of each of ten multi-layer sheets. Then the polypropylene foam sheet of each specimen was exfoliated and removed. The surface of the reinforcing sheet, which was left after exfoliation and removal of the polypropylene foam sheet, was rubbed with sandpaper in order to completely remove the above-mentioned thermoplastic resin foam sheet. Further, the surface layer, which was layered on and integrated with the surface of the above-mentioned reinforcing sheet, was scraped with a milling machine until the non-meltable fibers of the As the multi-layer sheet according to this invention has a structure as mentioned above, the multi-layer sheet is excellent in bending strength, compressive strength, thermoforming property and dimensional stability as well as lightweight property, and can ideally be used for an upholstery material for vehicles, an insulation material and a buffer material.

Further, according to the manufacturing method of the multi-layer sheet of this invention, the above-mentioned multi-layer sheet can be obtained without fail in such a simple manner that after the sheet for reinforcement is layered on one side of the expandable sheet to provide the expandable multi-layer sheet, the expandable multi-layer is foamed by using the heating apparatus which is generally used.

INDUSTRIAL FEASIBILITY

As mentioned above, the multi-layer sheet according to this invention is useful as an upholstery material for vehicles such as a ceiling material for vehicles, etc., an insulation material and further as a buffer material, and is particularly ideal for being used as a ceiling material for vehicles.

What is claimed is:

1. A manufacturing method of a multi-layer sheet comprising the steps of:

producing a modified thermoplastic resin by adding a multifunctional monomer to a thermoplastic resin so as to have the thermoplastic resin reacted with the multifunctional monomer, forming an expandable sheet by adding a pyrolysis foaming agent to the modified thermoplastic resin so as to melt and mix the resin at a temperature lower than a temperature of decomposition of the pyrolysis foaming agent, thereafter forming an expandable multi-layer sheet by layering a sheet for reinforcement on at least one side of the expandable sheet; said sheet for reinforcement being made of a non-woven fabric in which non-meltable fibers and thermoplastic resin fibers are interwound with one another, covering and concealing the sheet for reinforcement all over by layering on the sheet for reinforcement of the expandable multi-layer sheet a surface sheet made of a thermoplastic resin which is compatible with the thermoplastic resin fibers of the sheet for reinforcement, a melt index of the thermoplastic resin fibers of the sheet for reinforcement being 30 to 60 g/10 minutes and a melt index of the thermoplastic resin of which the surface layer is made being 20 g/10 minutes or less, thereafter foaming the expandable multi-layer sheet to obtain from the expandable sheet a thermoplastic resin foam sheet having an aspect ratio Dz/Dxy of bubbles of 1.2 or more, and an expansion ratio of 5 to 50 cc/g by heating the expandable multi-layer sheet at a temperature higher than a temperature of reaction of multifunctional monomer and than a temperature of decomposition of pyrolysis foaming agent, and binding the non-meltable fibers together by melting the thermoplastic resin fibers of the sheet for reinforcement, wherein the surface sheet is melted and entered into the sheet for reinforcement to be integrated with the thermoplastic resin foam sheet.

2. The multi-layer sheet as claimed in claim 1, wherein a per-unit weight of the reinforcing sheet is 10 to 70 g/m$^2$.

3. The multi-layer sheet as claimed in claim 1, wherein a content of non-meltable fibers in the reinforcing sheet is 20 to 90 weight %.

4. The multi-layer sheet as claimed in claim 1, wherein a fiber length of the non-meltable fibers is 30 to 100 mm.

5. The multi-layer sheet as claimed in claim 1, wherein a thickness of the surface layer is 10 to 200 μm.

6. The multi-layer sheet as claimed in claim 1, wherein the multi-layer sheet is used as an upholstery material for vehicle by forming it into a desired shape.

7. A manufacturing method of a multi-layer sheet comprising the steps of:

producing a modified thermoplastic resin by adding a multifunctional monomer to a thermoplastic resin so as to have the thermoplastic resin reacted with the multifunctional monomer, forming an expandable sheet by adding a pyrolysis foaming agent to the modified thermoplastic resin so as to melt and mix the resin at a temperature lower than a temperature of decomposition of the pyrolysis foaming agent, thereafter forming an expandable multi-layer sheet by layering a sheet for reinforcement on at least one side of the expandable sheet; said sheet for reinforcement being made of a non-woven fabric in which non-meltable fibers and thermoplastic resin fibers are interwound with one another, covering and concealing the sheet for reinforcement all over by layering on the sheet for reinforcement of the expandable multi-layer sheet a surface sheet made of a thermoplastic resin which is compatible with the thermoplastic resin fibers of the sheet for reinforcement, a melt index of the thermoplastic resin fibers of the sheet for reinforcement being 30 to 60 g/10 minutes and a melt index of the thermoplastic resin of which the surface layer is made being 20 g/10 minutes or less, thereafter foaming the expandable multi-layer sheet to obtain from the expandable sheet a thermoplastic resin foam sheet having an aspect ratio Dz/Dxy of bubbles of 1.2 or more, and an expansion ratio of 5 to 50 cc/g by heating the expandable multi-layer sheet at a temperature higher than a temperature of reaction of multifunctional monomer and than a temperature of decomposition of pyrolysis foaming agent, and binding the non-meltable fibers together by melting the thermoplastic resin fibers of the sheet for reinforcement, wherein the surface sheet is melted and entered into the sheet for reinforcement to be integrated with the thermoplastic resin foam sheet.

8. A manufacturing method of a multi-layer sheet comprising the steps of:

forming an expandable sheet by melting and mixing an expandable resin composite containing a thermoplastic resin, a crosslinking agent and a pyrolysis foaming agent, at a temperature lower than a temperature of reaction of the crosslinking agent and than a temperature of decomposition of the pyrolysis foaming agent, forming an expandable multi-layer sheet by layering a sheet for reinforcement on at least one side of the expandable sheet before or after providing a crosslinking structure with the expandable sheet by applying an electrically dissociatable radiation to the expandable sheet; said sheet for reinforcement being formed by a non-woven fabric in which non-meltable fibers and thermoplastic fibers are interwound with one another, covering and concealing the sheet for reinforcement all over by layering on the sheet for reinforcement of the expandable multi-layer sheet a surface sheet made of a thermoplastic resin which is compatible with the thermoplastic resin fibers of the sheet for reinforcement, a melt index of the thermoplastic resin fibers of the sheet for reinforcement is 30 to 60 g/10 minutes and a melt index of the thermoplastic resin of which the surface layer is made is 20 g/10 minutes or less, thereafter foaming the expandable multi-layer sheet to obtain from the expandable sheet a thermoplastic resin foam sheet having an aspect ratio Dz/Dxy of bubbles of 1.2 or more, and an expansion ratio of 5 to 50 cc/g by heating the expandable multi-layer sheet at a temperature higher than a temperature of decomposition of the pyrolysis foaming agent, and binding the non-meltable fibers together by melting the thermoplastic resin fibers of the sheet for reinforcement, wherein the surface sheet is melted and entered into the sheet for reinforcement to be integrated with the thermoplastic resin foam sheet.

9. The manufacturing method of a multi-layer sheet as claimed in claim 7 or claim 8, wherein a per-unit weight of the sheet for reinforcement is 10 to 70 g/m$^2$.

10. The manufacturing method of a multi-layer sheet as claimed in claim 7 or claim 8, wherein a content of non-meltable fibers in the sheet for reinforcement is 20 to 90 weight %.

11. The manufacturing method of a multi-layer sheet as claimed in claim 7 or claim 8, a fiber length of the non-meltable fibers is 30 to 100 mm.

12. A molding method of a multi-layer sheet comprising the steps of:

providing the multi-layer sheet as defined in claim 1, heating the multi-layer sheet to have a surface temperature of 160 to 210° C., and forming the sheet by means of male and female-type metal molds which are kept at a temperature of 10 to 70° C.

* * * * *

UNITED STATES PATENT AND TRADEMARK OFFICE
CERTIFICATE OF CORRECTION

| | | |
|---|---|---|
| PATENT NO. | : 6,984,445 B1 | Page 1 of 1 |
| APPLICATION NO. | : 10/204915 | |
| DATED | : January 10, 2006 | |
| INVENTOR(S) | : Kazuo Yamagata et al. | |

It is certified that error appears in the above-identified patent and that said Letters Patent is hereby corrected as shown below:

Column 37, lines 14 to 53, Claim 1, should read
--1. A multi-layer sheet comprising;
a thermoplastic resin foam sheet, the thermoplastic resin foam sheet having an aspect ratio Dz/Dxy of bubbles of 1.2 or more, and an expansion ratio of 5 to 50 cc/g,
a reinforcing sheet layered on and integrated with at least one side of the thermoplastic resin foam sheet; the reinforcing sheet being formed by a non-woven fabric which comprises non-meltable fibers which are interwound with one another and which are bound together with a thermoplastic resin and having an uneven surface attributable to the non-meltable fibers, and
a surface layer having a smooth surface and made of a thermoplastic resin compatible with the thermoplastic resin of the reinforcing sheet and layered on and integrated with a surface of the reinforcing sheet such that the uneven surface of the reinforcing sheet covered and concealed with the surface layer and a portion of the thermoplastic resin comprising the surface layer enters into the reinforcing sheet and is integrated with the thermoplastic foam sheet, wherein a melt index of the thermoplastic resin binding each of the non-meltable fibers of the reinforcing sheet is 30 to 60 g/10 minutes and a melt index of the thermoplastic resin of which the surface layer is made is 20 g/10 minutes or less. --.

Signed and Sealed this

First Day of August, 2006

JON W. DUDAS
*Director of the United States Patent and Trademark Office*